United States Patent
Hwang et al.

(10) Patent No.: US 7,372,836 B2
(45) Date of Patent: May 13, 2008

(54) METHOD OF TRANSMITTING CONTROL DATA IN CDMA MOBILE COMMUNICATION SYSTEM

(75) Inventors: Sung-Oh Hwang, Yongin-shi (KR);
Jae-Yoel Kim, Kunpo-shi (KR);
Kook-Heui Lee, Songnam-shi (KR);
Sung-Ho Choi, Songnam-shi (KR);
Yong-Jun Kwak, Yongin-shi (KR);
Sung-Hoon Kim, Seoul (KR);
Jin-Weon Chang, Seoul (KR); Ju-Ho Lee, Suwon-shi (KR); Hyun-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 912 days.

(21) Appl. No.: 10/115,349

(22) Filed: Apr. 3, 2002

(65) Prior Publication Data

US 2002/0141367 A1 Oct. 3, 2002

(30) Foreign Application Priority Data

Apr. 3, 2001 (KR) .......................... 2001-0019697
May 22, 2001 (KR) .......................... 2001-0028169

(51) Int. Cl.
*H04B 7/216* (2006.01)
(52) U.S. Cl. ..................... 370/335; 370/442; 455/451
(58) Field of Classification Search ................ 370/336; 455/451
See application file for complete search history.

(56) References Cited

U.S. PATENT DOCUMENTS

| | | | |
|---|---|---|---|
| 6,009,091 A * | 12/1999 | Stewart et al. | 370/342 |
| 6,215,814 B1 * | 4/2001 | Ylitalo et al. | 375/148 |
| 6,650,905 B1 * | 11/2003 | Toskala et al. | 455/522 |
| 6,791,960 B1 * | 9/2004 | Song | 370/335 |
| 6,831,943 B1 * | 12/2004 | Dabak et al. | 375/147 |
| 6,882,727 B1 * | 4/2005 | Vialen et al. | 380/33 |
| 6,934,275 B1 * | 8/2005 | Love et al. | 370/342 |
| 7,006,464 B1 * | 2/2006 | Gopalakrishnan et al. | 370/328 |
| 7,061,878 B2 * | 6/2006 | Kwon et al. | 370/278 |
| 2002/0009061 A1 * | 1/2002 | Willenegger | 370/328 |
| 2002/0064140 A1 * | 5/2002 | Numminen | 370/311 |
| 2002/0141331 A1 * | 10/2002 | Mate et al. | 370/218 |

(Continued)

FOREIGN PATENT DOCUMENTS

EP    1 248 485    10/2002

OTHER PUBLICATIONS

European Search Report dated Aug. 16, 2002 issued in counterpart application, namely, EP Appln. No. 02007576.

(Continued)

*Primary Examiner*—Chi Pham
*Assistant Examiner*—Kevin Mew
(74) *Attorney, Agent, or Firm*—The Farrell Law Firm, P.C.

(57) ABSTRACT

A device and method for configuring an UL-DPCCH. One or more UL-DPCCHs, especially a UL-DPCCH for supporting HSDPA, are constructed in code division multiplexing and transmitted according to the characteristics of control information. The UL-DPCCH of the present invention that delivers various kinds of control information can be configured flexibly and operate in compatibility with a conventional asynchronous mobile communication system.

24 Claims, 24 Drawing Sheets

U.S. PATENT DOCUMENTS

2002/0141436 A1* 10/2002 Toskala ................. 370/442
2005/0208961 A1* 9/2005 Willenegger ............ 455/522

OTHER PUBLICATIONS

"Control Channel Structure for High Speed DSCH (HS-DSCH)", Apr. 2001, pp. 1-5.

"Uplink Channel Structure for HSDPA", Apr. 2001, pp. 1-2.

Universal Mobile Telecommunications System (UMTS), Physical Channels and Mapping of Transport Channels onto Physical Channels (FDD), Sep. 2000, pp. 1-43.

"Downlink and Uplink Channel Structures for HSDPA", Nov. 2000, pp. 1-7.

"Text Proposal for the HSDPA Technical Report", Nov. 2000, pp. 1-19.

"Control Channel Structure for High Speed DSCH", Oct. 2000, pp. 1-3.

"TSG-RAN WG1/WG2 Joint Meeting HSDPA", Apr. 2001, pp. 1-29.

"Uplink Signalling for Hybrid ARQ", May 2001, pp. 1-4.

Communication from European Patent Office dated Nov. 5, 2003 issued in a counterpart application, namely, Appln. No. 02007576.8.

Universal Mobile Telecommunications System (UMTS); Spreading and Modulation (FDD), 1999.

* cited by examiner

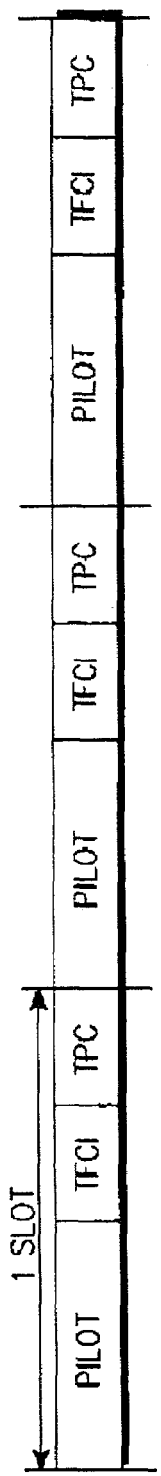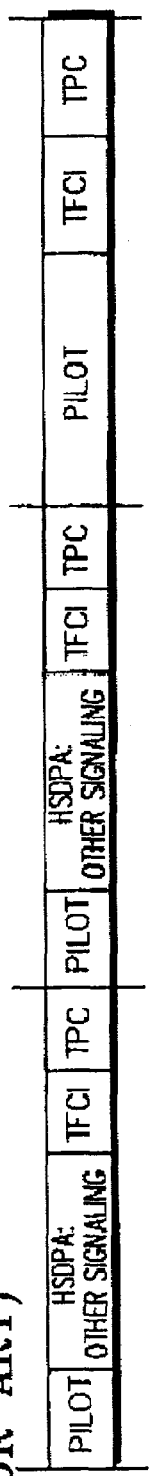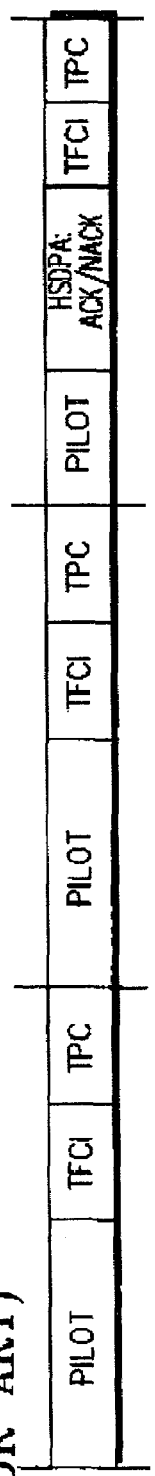
FIG. 11A (PRIOR ART)
FIG. 11B (PRIOR ART)
FIG. 11C (PRIOR ART)
FIG. 11D (PRIOR ART)

METHOD OF TRANSMITTING CONTROL DATA IN CDMA MOBILE COMMUNICATION SYSTEM

PRIORITY

This application claims priority to applications entitled "Method of Transmitting Control Data in CDMA Mobile Communication System" filed in the Korean Industrial Property Office on Apr. 3, 2001 and assigned Ser. No. 19697/2001, and entitled "Method of Transmitting Control Data in CDMA Mobile Communication System" filed in the Korean Industrial Property Office on May 22, 2001 and assigned Ser. No. 28169/2001, the contents of both of which are hereby incorporated by reference.

BACKGROUND OF THE INVENTION

1. Field of the-Invention

The present invention relates generally to a device and a method for transmitting a downlink/uplink control channel in CDMA (Code Division Multiple Access) mobile communication system, and in particular, to a device and a method for transmitting a downlink/uplink control channel, which provide compatibility between an HSDPA (High Speed Downlink Packet Access) mobile communication system and a non-HSDPA mobile communication system.

2. Description of the Related Art

Mobile communication systems have been developed to additionally provide high-speed, high-quality packet data for data service or multimedia service as well as voice service. The $3^{rd}$ generation mobile communication systems, which are divided into asynchronous ones (3GPP) and synchronous ones (3GPP2), are being standardized to realize high-speed, high-quality wireless data packet services. For example, HSDPA is undergoing standardization within the 3GPP and the 1xEV/DV within 3GPP2. Efforts to find ways to provide high-quality wireless data packet services at a data rate of 2 Mbps or higher have driven these standardization activities, and the $4^{th}$ Generation mobile communication systems will be designed to provide higher-speed, higher-quality multimedia services.

HSDPA requires advanced technology improving the capability of adapting to channel conditions beyond the technology needed to implement the existing mobile communication systems. The following three schemes have been introduced to HSDPA to support high-speed packet transmission.

(1) Adaptive Modulation and Coding Scheme (AMCS): A modulation and coding scheme (MCS) for a data channel is determined according to the channel condition between a cell and a user, thus increasing the overall use efficiency of the cell. The MCS is a combination of modulation and coding schemes and there are defined a plurality of MCSs numbering level 1 to level n. The AMCS is an optimum MCS chosen among the MCSs according to the channel status between the cell and the user.

(2) N-channel Stop and Wait Hybrid Automatic Retransmission Request (n-channel SAW HARQ): This is a kind of HARQ. In conventional ARQ, an ACK (acknowledgment) signal and a retransmission packet are exchanged between a UE and a node B controller, while in HADPA, the exchange occurs between the UE and a high-speed downlink shared channel (HS-DSCH) in the MAC layer of the node B. Another feature of the n-channel SAW HARQ is that when an ACK signal not received, a plurality of packets can be transmitted on n logical channels. The node B does not transmit the next packet until it receives an ACK signal for the previous transmitted packet from the UE in typical Stop and Wait ARQ. In other words, the node B must await the ACK signal although it can transmit the next packet. On the contrary, in the n-channel SAW HARQ the node B can transmit a plurality of next packets successively even if it does not receive the ACK signal for the previous transmitted packet, thereby increasing channel use efficiency. That is, if n logical channels are established between the UE and the node B and those logical channels can be identified by their channel numbers or their transmission time, the UE can determine on what channel a packet is received at some point in time and also rearrange received packets in the right reception order.

(3) Fast Cell Selection (FCS): The FCS scheme allows an HSDPA UE in a soft handover region (SHR) to receive packets from only a cell in the best channel condition, so that the overall interference is reduced. If another cell exhibits the best channel condition, the UE receives packets from the cell on an HS-DSCH with minimum communication interruption.

Due to the introduction of the new schemes above, new control signals are configured between the UE and the node B in HSDPA. For AMCS, the UE reports the channel condition between the UE and the node B. The node B then notifies the UE of an MCS level determined based on the channel condition. For n-channel SAW HARQ, the UE transmits an ACK/NACK (Negative Acknowledgment) signal to the node B. For FCS, the UE transmits a signal indicating the best cell to a node B that offers the best-quality channel. If the best cell is changed, the UE reports its packet reception status to the new best station. Then, the new best node B provides necessary information to aid the UE in selecting the best cell correctly.

As described above, since additional related information is required for supporting HSDPA, different UL-DPCH (Uplink Dedicated Physical Channel) structures are adopted depending on whether HSDPA is supported or not.

A description will first be made of a conventional UL-DPCH structure not supporting HSDPA. FIG. 9 illustrates the frame structure of the conventional UL-DPCH when HSDPA is not supported.

Referring to FIG. 9, one UL-DPCH frame is comprised of 15 slots, from slot #0 to slot #14. The UL-DPCH contains the UL-DPDCH (Uplink Dedicated Physical Data channel) and the UL-DPCCH (Uplink Dedicated Physical Control Channel). The UL-DPDCH carries higher-layer frame data to a node B in each slot. The UL-DPCCH carries control information such as a pilot symbol, TFCI (Transport Format Combination Indicator) bits, an FBI (Feedback Information) symbol, and a TPC (Transmit Power Control Commander) symbol in each slot. The pilot symbol is a channel estimation signal by which uplink data is demodulated. The TFCI bits indicate in what TFC channels are transmitted for the duration of the current frame. The FBI symbol transmits feedback information in the case of transmit diversity. The TPC symbol is used to control downlink transmission power. The UL-DPCCH is spread with an SF=256 orthogonal code all the time. SF represents a spreading factor.

The above-described UL-DPCCH cannot transmit necessary information if HSDPA is supported. Therefore, a novel UL-DPCCH should be configured for HSDPA. FIG. 10 to FIG. 11D illustrate conventional UL-DPCCH structures for support of HSDPA.

FIG. 10 illustrates a conventional UL-DPCCH supporting HSDPA, which is a modification to the UL-DPCCH illustrated in FIG. 9. Referring to FIG. 10, an SF=128 orthogonal code is applied to the UL-DPCCH so that more bits (20 bits) can be transmitted at the same chip rate in each slot than in the UL-DPCCH illustrated in FIG. 9. As a result, the UL-DPCCH carries HSDPA control information as well as UL-DPDCH control information. Each slot is the same in structure in an UL-DPCCH frame. In each slot, the UL-DPCCH carries ACK bits and Meas bits in addition to the pilot symbol, the TFCI bits, the FBI symbol, and the TPC symbol illustrated in FIG. 9. The ACK bits indicate whether an error has been detected in received downlink HSPA data and the Meas bits indicate the downlink channel condition measured at the UE to determine an appropriate MCS level in the node B.

FIG. 11A to FIG. 11D illustrate the structure of another conventional UL-DPCCH supporting HSDPA, which is another modification to the UL-DPCCH illustrated in FIG. 9. Referring to FIG. 11A to FIG. 11D, an SF=128 orthogonal code is applied to the UL-DPCCH so that more bits (20 bits) can be transmitted at the same chip rate in each slot than in the UL-DPCCH illustrated in FIG. 9. As a result, the UL-DPCCH can carry HSDPA control information as well as UL-DPDCH control information. Unlike the slot structure illustrated in FIG. 10, however, the UL-DPCCH adopts different slot structures within each TTI (Transmission Time Interval) having three slots. Thus, the UL-DPCCH carries control information in time division. In FIG. 11A, the UL-DPCCH delivers only UL-DPDCH control information in a TTI. In FIG. 11B, the UL-DPCCH delivers HSDPA control information in the first two slots and UL-DPDCH control information in the last slot of the TTI. In FIG. 11C, the UL-DPCCH delivers UL-DPDCH control information in the first two slots and ACK/NACK information in the last slot of the TTI. In FIG. 11D, the UL-DPCCH delivers HSDPA control information excluding ACK/NACK in the first two slots and the ACK/NACK information in the last slot of the TTI. As seen from FIG. 11A to FIG. 11D, each slot in a TTI may have a different structure, if necessary. This variable slot structure allows the node B to determine whether to retransmit HSDPA data by processing the ACK/NACK information and prepare substantially for retransmission because the UL-DPCCH carries the ACK information in one slot of a TTI and the remaining HSDPA control information or the UL-DPDCH control information in the other slots of the TTI.

When both the node B and the UE support HSDPA, they know the UL-DPCCH structure illustrated in FIG. 10 or FIG. 11A to FIG. 11D. On the contrary, when both the node B and the UE do not support HSDPA, the UL-DPCCH structure illustrated in FIG. 10 or FIG. 11A to FIG. 11D is not available. For example, if the node B does not provide an HSDPA service, it cannot receive the UL-DPCCH illustrated in FIG. 10 or FIG. 11A to FIG. 11D.

Meanwhile, the UE may enter an SHR in which the coverage areas of an HSDPA node B and a non-HSDPA node B overlap. In the soft handover situation, the UL-DPCCH structure illustrated in FIG. 10 or FIG. 11A to FIG. 11D is not known to the non-HSDPA node B. As a result, the node B cannot receive UL-DPDCH control information.

Accordingly, there is a need for designing an UL-DPCCH in such a way that even the non-HSDPA node B can receive control information from the HSDPA UE. In other words, the aim of designing the UL-DPCCH is to offer compatibility between the HSDPA UE and the non-HSDPA node B.

To support HSDPA, the node B should transmit the following control information to the UE:

1) HSDPA indicator (HI): this indicates whether there exists HSDPA data destined for the UE.

2) MCS level: the MCS level indicates a modulation and channel coding scheme used for an HS-DSCH.

3) HS-DSCH channelization code: the channelization code of an HS-DSCH used for the UE.

4) HARQ process number: this indicates on which logical channel a particular packet is transmitted when using n-channel SAW HARQ.

5) HARQ packet number: the number of a downlink data packet known to the UE so that the UE can report an HSDPA data reception state to a new best cell if a best cell is changed in FCS.

Besides the above control information, the node B transmits an uplink transmission power offset value to the UE so that the UE can transmit information indicating a selected best cell to neighboring nodes B using the uplink transmission power offset value.

FIG. 16 illustrates the structure of a conventional DL-DPCH (Downlink Dedicated Physical Channel) specified in the 3GPP Release 99 (R-99) specification for an existing non-HSDPA mobile communication system. Referring to FIG. 16, the DL-DPCH carries data needed support the operation of a higher layer or dedicated service data, like voice, in a first data field Data1 and a second data field Data2. A TPC field transmits a downlink transmission power control command by which uplink transmission power is controlled, a TFCI field transmits information about the TFC of the first data field Data1 and the second data field Data2, and a pilot field has a preset pilot symbol sequence by which the UE estimates downlink channels.

The DL-DPCH structure of FIG. 16 defined by Release 99 cannot provide an HSDPA service to the UE. Accordingly, there is a need for exploring a novel DL-DPCH structure to support HSDPA. Meanwhile, an HSDPA UE may simultaneously receive data packets on an HS-DSCH from an HSDPA node B and data on a DL-DPCH from a non-HSDPA node B. Therefore, a novel DL-DPCCH for HSDPA should be designed to support the traditional services provided by Release 99 as well as the HSDPA service.

If HSDPA is implemented, HSDPA and non-HSDPA mobile communication systems will inevitably coexist. Therefore, a novel UL-DPCH and a novel DL-DPCH must be defined with compatibility between the HSDPA and non-HSDPA mobile communication systems.

SUMMARY OF THE INVENTION

It is, therefore, an object of the present invention to provide a device and method for transmitting control data on a UL-DPCCH regardless of whether HSDPA is supported or not in a mobile communication system.

It is another object of the present invention to provide a device and method for transmitting control data on at least two UL-DPCCHs for HSDPA.

It is a further object of the present invention to provide a control data transmitting device and method for more reliably transmitting uplink HSDPA control information in an HDSPA mobile communication system.

It is still another object of the present invention to provide a control data transmitting device and method that enable a node B to receive a plurality of UL-DPCCHs for HDSPA in an HDSPA mobile communication system.

It is yet another object of the present invention to provide a device and method for transmitting downlink and uplink control channels with compatibility between an HSDPA node B/UE and a non-HSDPA UE/node B.

The foregoing and other objects of the present invention are achieved by providing a control data transmitting method for a CDMA mobile communication system. To transmit high speed packet data to a UE, a node B transmits a DL-DPCCH signal including a pilot signal, TFCI bits, a TPC command, dedicated channel data, and an HS-DSCH indicator indicating an SCCH, and transmits control information needed for the UE to receive the high speed packet data on the SCCH. The node B spreads the high speed packet data with a spreading code included in the control information transmitted on the SCCH and transmits the spread high speed packet data on an HS-DSCH.

BRIEF DESCRIPTION OF THE DRAWINGS

The above and other objects, features and advantages of the present invention will become more apparent from the following detailed description when taken in conjunction with the accompanying drawings in which:

FIG. 11 illustrates the structure of another conventional UL-DPCCH supporting HSDPA;

DETAILED DESCRIPTION OF THE PREFERRED EMBODIMENTS

Figure 1:
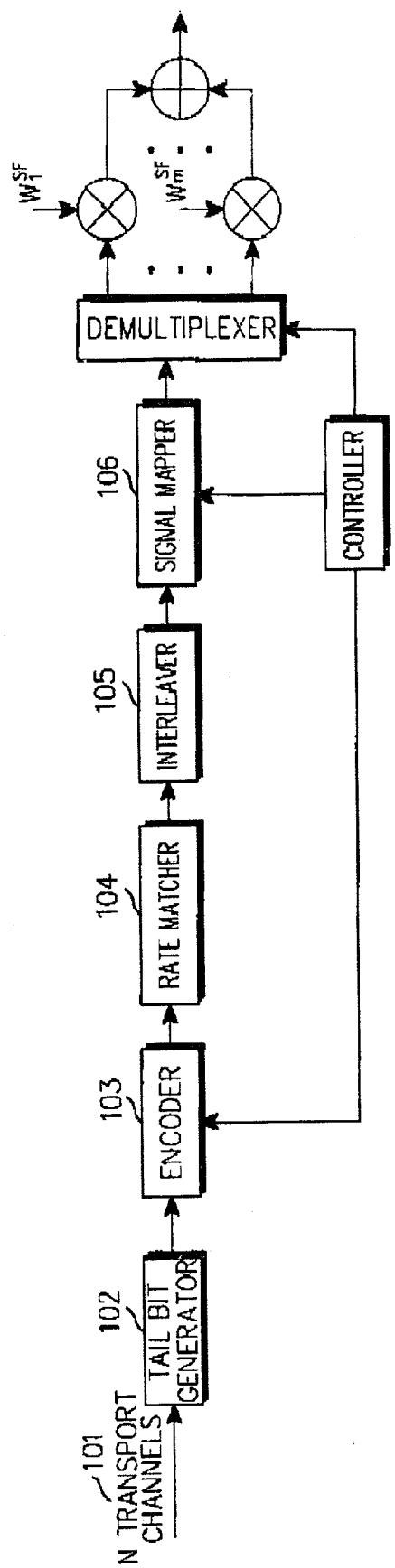
FIG. 1 is a block diagram of a conventional downlink transmitter.

Preferred embodiments of the present invention will be described hereinbelow with reference to the accompanying drawings. In the following description, well-known functions or constructions are not described in detail since they would obscure the invention in unnecessary detail.

The present invention provides a method of ensuring compatibility between an HSDPA UE/node B and a non-HSDPA node B/UE. For this purpose, a novel UL-DPCH and a novel DL-DPCH should be defined and a transmitter and a receiver operating with the novel UL-DPCH and DL-DPCH should also be provided.

First, a method of transmitting uplink HSDPA control information and the structure of a UL-DPCCH that carries the HSDPA control information are provided. In addition to the conventional UL-DPCCH, one or more novel UL-DPCCHs are configured to support HSDPA.

In general, all OVSF (Orthogonal Variable Length Spreading Factor) codes are available to a UE, which implies that channelization codes are abundant. If HSDPA is supported using a modification to the traditional UL-DPCCH, a compatibility problem may arise in the conventional mobile communication systems and the channel structure will be very complex. In this context, a novel UL-DPCCH is defined using a new channelization code in the present invention. Since the conventional UL-DPCCH is also transmitted during an HSDPA service in progress, the HSDPA UE can communicate with the non-HSDPA node B without a change in slot structure. The novel UL-DPCCH will be referred to as an HS-DPCCH.

To support HSDPA, the HS-DCCH should deliver the following control information.

The UE first should report to neighboring node Bs including the best node B the channel qualities between the UE and the node Bs. The channel qualities are determined by measuring the RSCP (Received Signal Coded Power) of CPICHs (Common Pilot Channels) from the node Bs. In the present invention, the UE indicates the channel quality by a channel quality indicator (CQI).

The UE performs an error check on data received from a node B and tells the node B the error check result with an ACK/NACK signal. In general, the ACK/NACK signal is one bit in SAW ARQ. HSDPA also assigns only one bit to the ACK/NACK signal even if the n-channel SAW ARQ scheme is used. In the present invention, information representing the presence or absence of errors in received data is defined as ACK/NACK.

The UE measures the channel qualities of all neighboring cells including a best cell in communication. If a neighboring cell has a better channel quality than the current best cell, the UE designates the neighboring cell as a new best cell and commences communication with the new best cell. At the same time, the UE notifies the new best cell that it has been designated as the best cell by a control signal. In the present invention, the control signal is referred to as a BCI (Best Cell indicator).

To implement the aforementioned FCS scheme, the UE reports its reception status to the new best cell using a set of the identifiers of packets received so far. For example, if packets are numbered sequentially and the sequence numbers are consistently managed in the old best cell, the new best cell, and the UE, the reception status can be indicated by a small amount of information. In the present invention, the reception status is called EQS (End Queue Status).

Meanwhile, the node B performs channel estimation to receive the uplink control information. To do so, it needs a pilot channel for channel estimation and power control bits for downlink power control.

In summary, the HS-DPCCH according to the present invention delivers control information including CQI, ACK/NACK, BCI, EQS, a pilot channel, and power control bits.

The above control information is divided into two classes depending on transmission time. CQI, ACK/NACK and BCI are transmitted periodically and EQS is transmitted only when the FCS scheme is implemented. Since the BCI is closely related with the FCS, the BCI may be classified as conditionally transmitted control information like the FCS. To increase its transmission reliability, the BCI is transmitted periodically in the present invention.

The HSDPA control information is transmitted to the node B on physical channels, DPCCH and DPDCH. Despite the advantage of fast transmission, the DPCCH is limited in the amount of transmission data and supports only a continuous transmission mode. Meanwhile, the DPDCH carries data only when necessary, but takes much time. Taking the characteristics of the DPCCH and the DPDCH into account, the EQS is transmitted on the DPDCH and the periodical information, that is, the CQI, ACK/NACK and BCI are transmitted on the DPCCH in the present invention. The UL-DPCCH refers to a control channel for the UL-DPCH in the conventional asynchronous mobile communication systems. To differentiate the conventional UL-DPCCH from the novel UL-DPCCH, the latter is termed the HS-DPCCH. Here, the periodical information is transmitted on a TTI basis.

A downlink transmitter for transmitting HS-DSCH data on a TTI basis in a node B is illustrated in FIG. 1. Referring to FIG. 1, an HS-DSCH in the MAC layer of the node B delivers a transport block to the physical layer. The transport block takes the form of a MAC header added to segmented data from a higher layer. A tail bit generator 102 mixes tail bits with such transport blocks in the time domain to improve the coding performance of the transport blocks. An encoder 103 encodes the transport blocks received from the tail bit generator 102 by a predetermined coding method and outputs code symbols. A rate matcher 104 matches the code symbols to a symbol number allowed for a TTI by symbol repetition and puncturing. An interleaver 105 interleaves the rate-matched symbols and a signal mapper 106 modulates the interleaved symbols by a predetermined modulation method like QPSK, 8-PSK, and M-ary QAM. A demultiplexer (DEMUX) 108 sequentially demultiplexes the modulation symbols to M symbol sequences. Each of the M symbol sequences is multiplied by a different OVSF in a corresponding multiplier, for spreading. A summer sums the spread M symbol sequences on a symbol basis. Here, the input of the encoder 103 is called a coding block. In general, a coding block differs from a transport block in size. The size difference is compensated for by tail bits generated in the tail bit generator 102. The TTI is a slot time from an arbitrary point in time to completed transmission of a coding block. If three slots are taken to transmit a coding block, the TTI is three slots. The TTI is determined according to the size of a coding block, a selected MCS level, and the number and SF of assigned channelization codes.

How the TTI is determined will be described in more detail.

The MCS level, which is a combination of a code rate and a modulation method as is known from its term, is determined according to the channel quality at a corresponding point in time. Consequently, MCS levels correspond to data rates per channelization code on a one-to-one basis. For example, if a channelization code having an SF of 32 is a channelization code assignment unit, each channelization code has a transmission capability of 80 ksps (symbol per second). If an MCS level assigned for transmission of a coding block represents 64QAM as a modulation method and a turbo code rate of 0.5, the MCS level can transmit three bits per symbol. Given the MCS level and 20 channelization codes, the total date rate is 4800 kbps by multiplying 80 (the symbol rate per channelization code), 3 (the number of bits per symbol), and 20 (the number of channelization codes assigned to a UE at a corresponding time point). If the coding block size is 3200 bits, the TTI of the coding block is one slot. As stated before, the TTI is determined by the three factors of MCS level, the number of channelization codes, and coding block size. As the MCS level and the number of channelization codes assigned to one UE are time-varying, the TTI is also likely to be changed with time. Considering the least time unit for information transmission is a slot with 0.667 msec in duration in the current asynchronous mobile communication system, the TTI will vary on a one-slot basis. It should be noted here, that the period of periodical information is the TTI and since the information should be transmitted every slot in some occasions, a minimum TTI should be used as a common period. EQS is transmitted on the DPDCH and so it must be transmitted as a signaling signal for a higher layer. Since an entity using the EQS information is the MAC HS-DSCH of the node B, the EQS information is transmitted in the form of MAC PDUs (Protocol Data Units).

Now, a description will be made of a method of transmitting downlink control information to support HSDPA and the structure of a DL-DPCCH to carry the control information. The downlink HSDPA control information includes MSC level, HS-DSCH channelization code, HARQ process number, and HARQ packet number.

1. Feedback Information Transmission.

Figure 2:
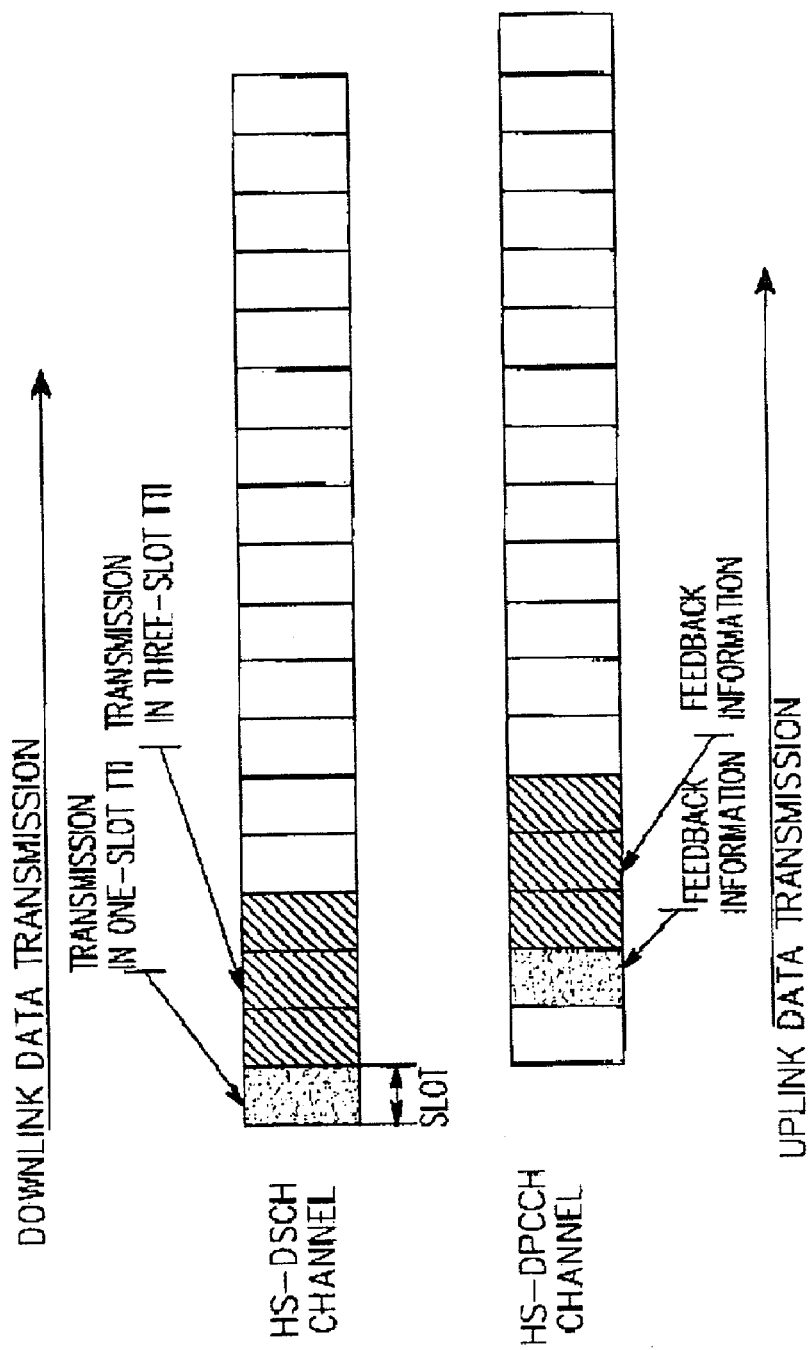
FIG. 2 illustrates an embodiment of uplink control information transmission on an HS-DCCH according to the present invention.

FIG. 2 illustrates an embodiment for transmitting uplink feedback information in response to received downlink data according to the present invention. Referring to FIG. 2, if a node B transmits data on the HS-DSCH in a TTI having one slot, a UE receives the data in the TTI. Meanwhile, the UE transmits feedback information for the received data on the HS-DPCCH in the slot following the received slot. The feedback information is transmitted in one slot equal to the TTI length.

On the other hand, if the node B transmits data on the HS-DSCH in a TTI including three slots, the UE receives the data in the TTI. Then, the UE transmits feedback information for the received data to the node B on the HS-DPCCH in three slots following the first of the received slots. The feedback operation is performed based on the TTI. If the TTI is greater than a minimum TTI, the same information is transmitted repeatedly. In the present invention, it can be further contemplated that even if the TTI is changed, the uplink feedback information is transmitted only one time on a minimum TTI basis.

Figure 3:
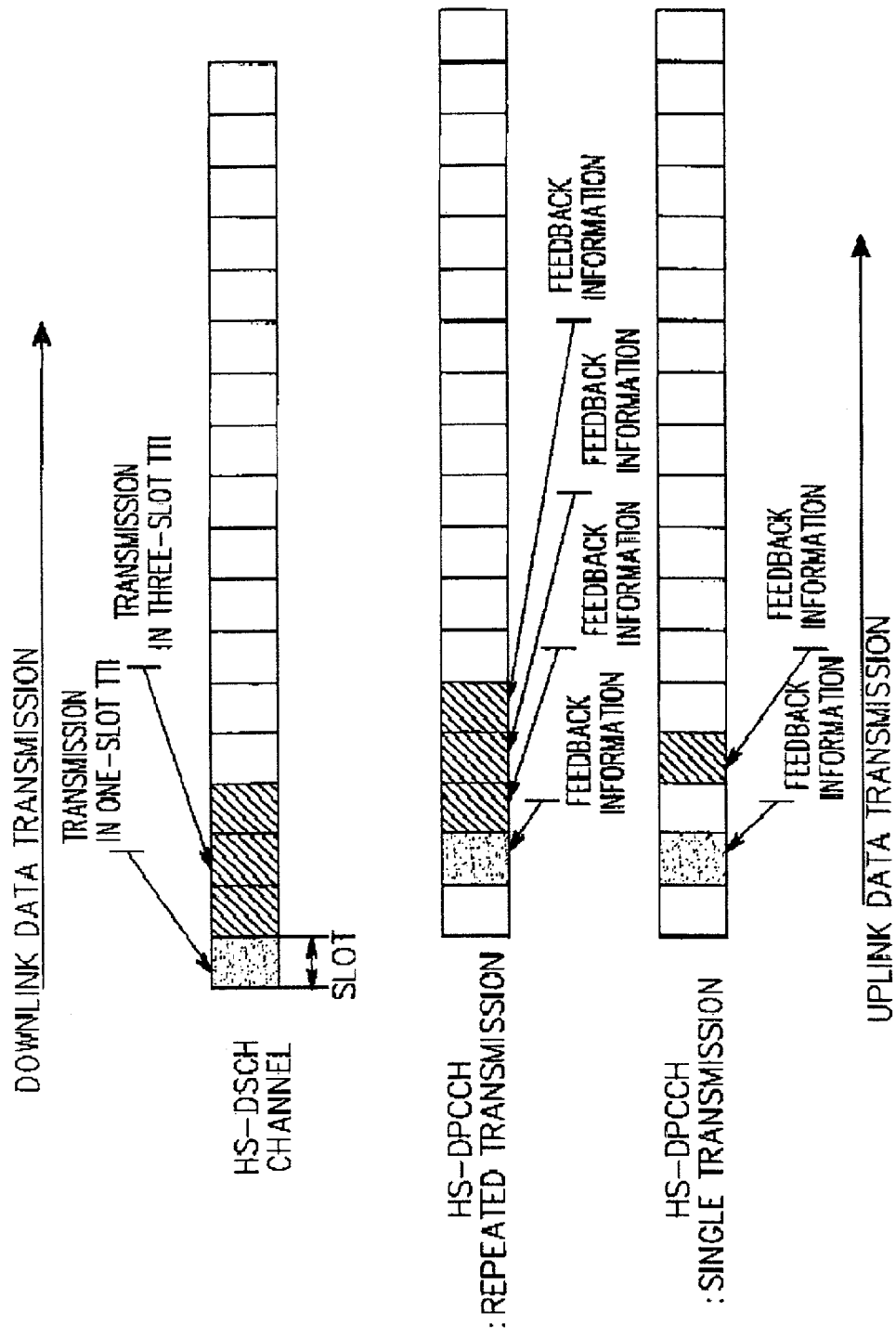
FIG. 3 illustrates another embodiment of uplink control information transmission on the HS-DCCH according to the present invention.

Referring to FIG. 3, a method for fixing the transmission duration of the feedback information will be described. If the TTI is one slot, the feedback information is transmitted in the same manner as illustrated in FIG. 2. If the TTI of the HS-DSCH is three slots, the UE transmits one-slot feedback information for the received data three times in the three slots following the first received slot, or once in one of the three slots. The conventional DPCCH operates in the conventional manner.

2. Structures of Feedback Information.

Figure 4:
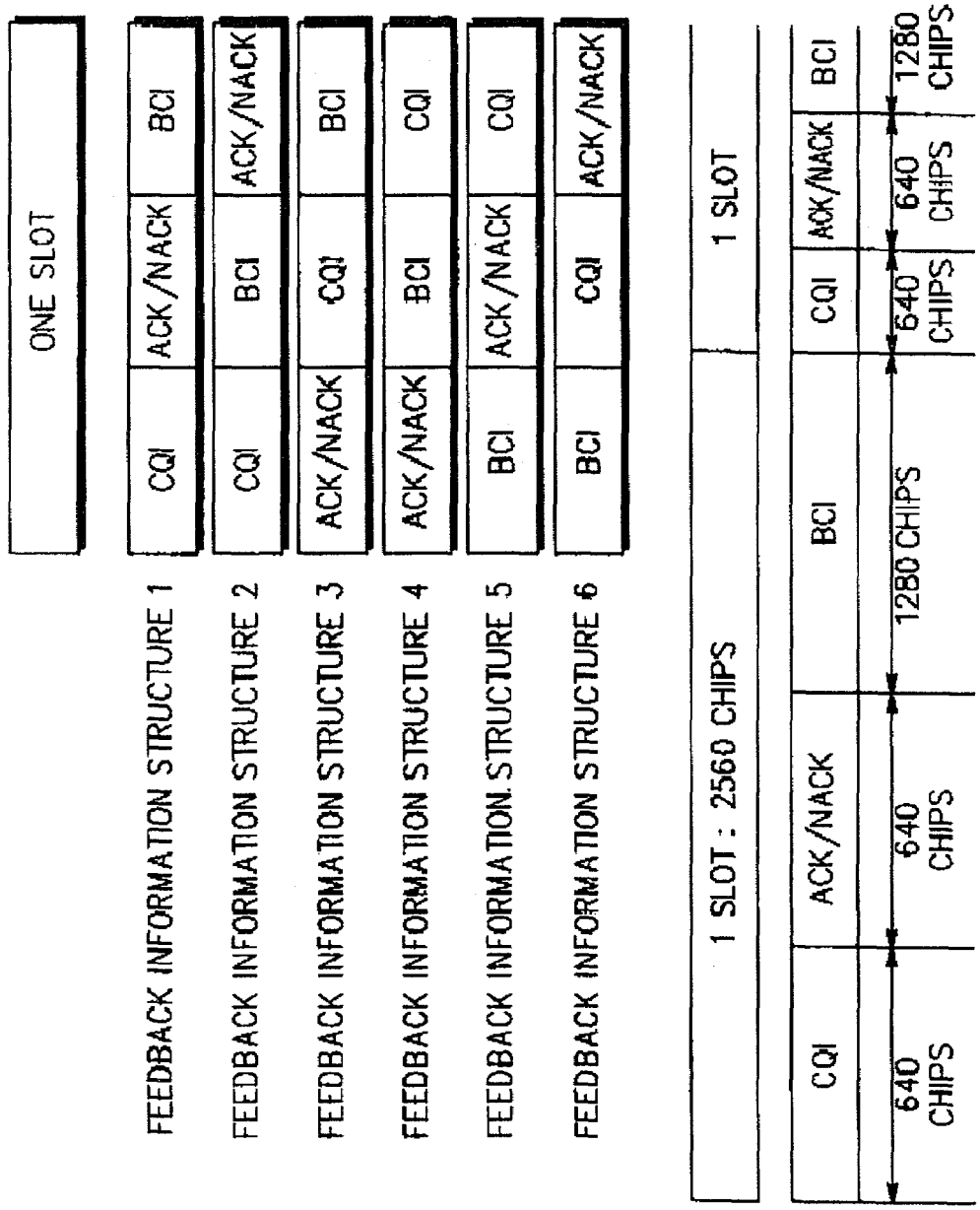
FIG. 4 illustrates an embodiment of an HS-DPCCH structure for transmitting uplink HSDPA control information according to the present invention.

FIG. 4 illustrates an embodiment of an HS-DPCCH structure that carries the feedback information according to the present invention.

In feedback information structure 1, six bits, one bit and three bits are assigned respectively to the CQI, the ACK/NACK, and the BCI. Here, it is assumed that the HS-DPCCH uses an SF of 64. If (10, 6) block coding, (10, 1) block coding, and (20, 3) block coding are applied respectively to the CQI, the ACK/NACK, and the BCI, they then have 640, 640, and 1280 chips, respectively. This slot structure is shown in the lower part illustrated in FIG. 4. Here, the strongest block coding is applied to the ACK/NACK. If the BCI information is most significant, the 1280-chip BCI can be transmitted with increased power. The feedback information structures illustrated in FIG. 4 are alike except the ordering of control information in one slot.

Figure 5:
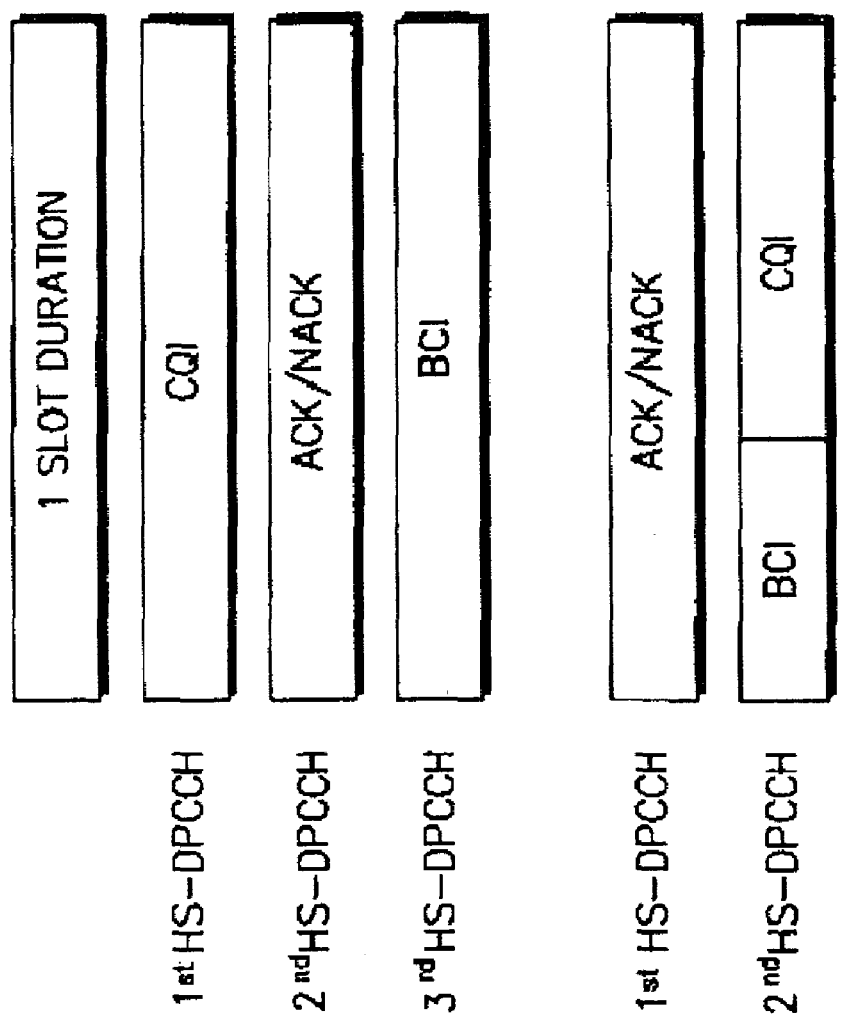
FIG. 5 illustrates another embodiment of the HS-DPCCH structure for transmitting uplink HSDPA control information according to the present invention.

FIG. 5 illustrates another embodiment of the HS-DPCCH structure that carries the feedback information according to the present invention. In this HS-DPCCH structure, the feedback information is multiplexed.

Referring to FIG. 5, different SFs may be used for the feedback information. It is assumed that CQI and ACK/NACK are transmitted with an SF of 256 and BCI with an SF of 128. If the same bits are assigned to each of the control information pieces, CQI, ACK/NACK, and BCI are sequentially transmitted on first and second SF=256 HS-DPCCHs and a third SF=128 HS-DPCCH. The feedback information transmission method illustrated in FIG. 5 advantageously increases transmission reliability and therefore reduces erroneous interpretation-caused performance deterioration of the HSDPA communication system, as compared to time-division transmission.

In the lower part of FIG. 5, it is illustrated that the ACK/NACK is spread with a code, and both the BCI and the CQI are spread with another code. Other control information combinations are available. The simultaneous use of code division and time division in transmitting the feedback information enables the reliability of individual control information to be adjusted efficiently by applying different transmission power to control information using a different code.

Figure 15A:
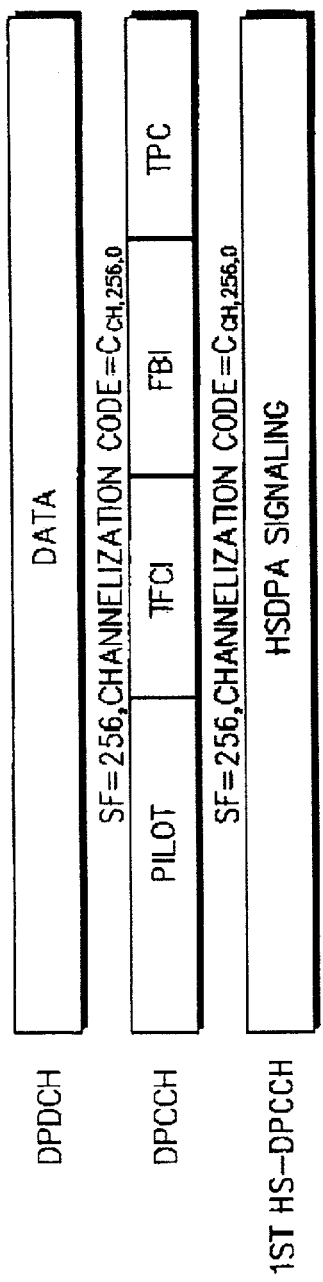
FIGS. 15A and 15B illustrate a fourth embodiment of the UL-DPCH according to the present invention.
Figure 15B:
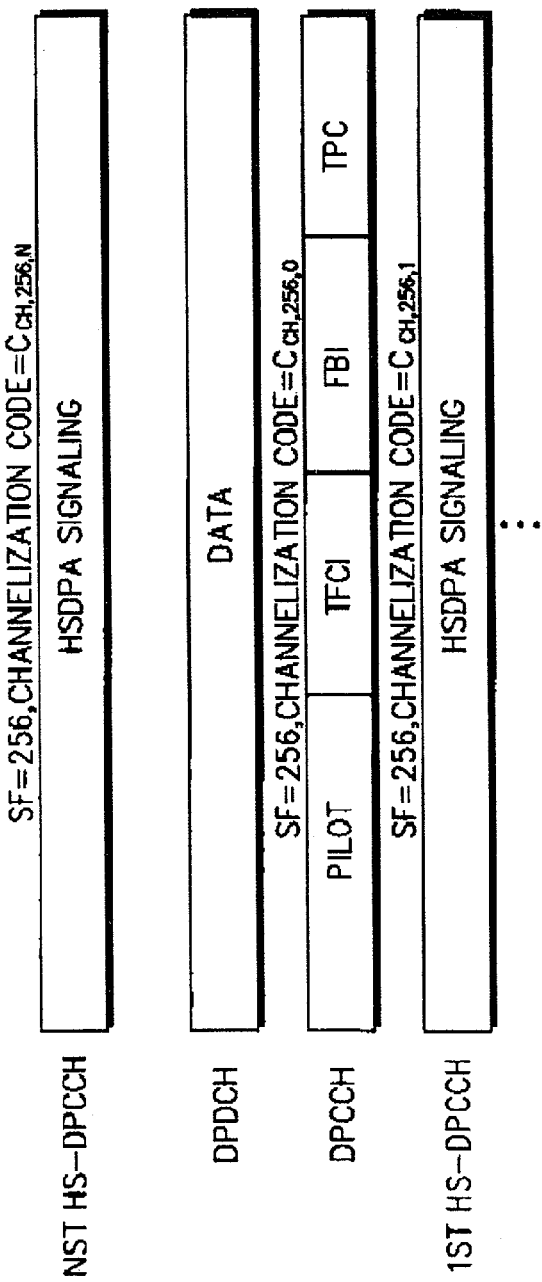

Configuration of one or at least two UL-DPCCHs for HSDPA using different channelization codes has been described in connection with FIGS. 4 and 5. In these cases, control information for a DPCH is transmitted all the time in the slot structure that can be received in a non-HSDPA supporting node B, as illustrated in FIGS. 15A and 15B.

Figure 6:
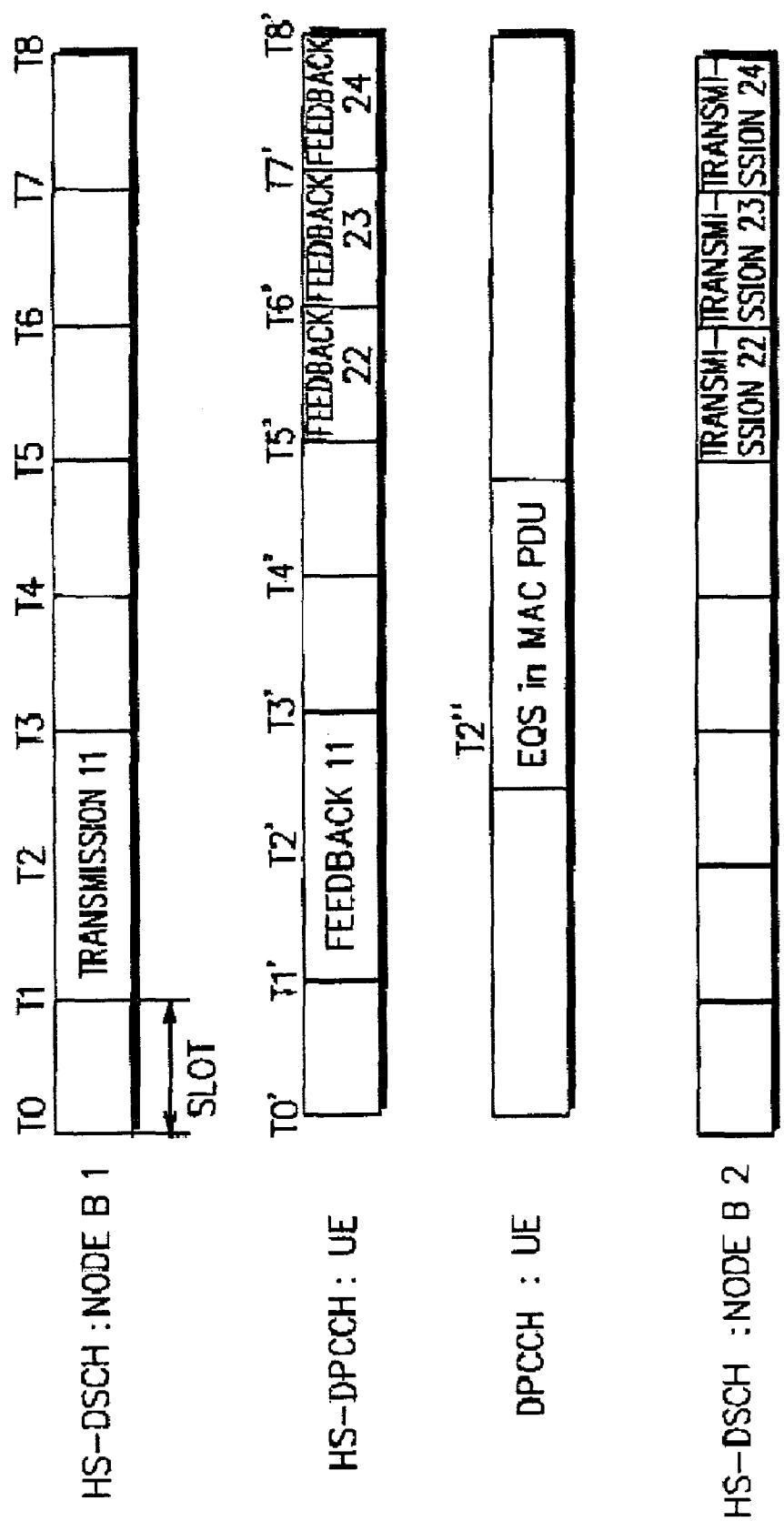
FIG. 6 illustrates EQS transmission on an UL-DPDCH according to the present invention.

FIG. 6 illustrates EQS transmission according to the present invention.

If the UE is located in the SHR defined as the overlapped region between node B 1 and node B 2, it determines that node B 2 offers better channel quality than node B 1 by measuring the channel qualities of its neighboring cells, while in communication with node B 1 at time T1. Then, the UE sets a BCI to indicate node B 2, while sending feedback information for transmission 11 to node B 1 at time T1', and sends an EQS to node B 2 on a DPDCH at time T2". Node B 2, which receives the HS-DPCCH from the UE, is notified at the T2' that it is designated as the best cell of the UE, commences receiving data on the DPDCH, and sends it to its MAC HS-DSCH. Upon receipt of the EQS, the MAC HS-DSCH checks the status of a receiver buffer in the UE, determines data to be transmitted, and initiates transmission to the UE at time T5.

3. UL-DPCH 3.1 Structure of UL-DPCH

Figures 9, 10:
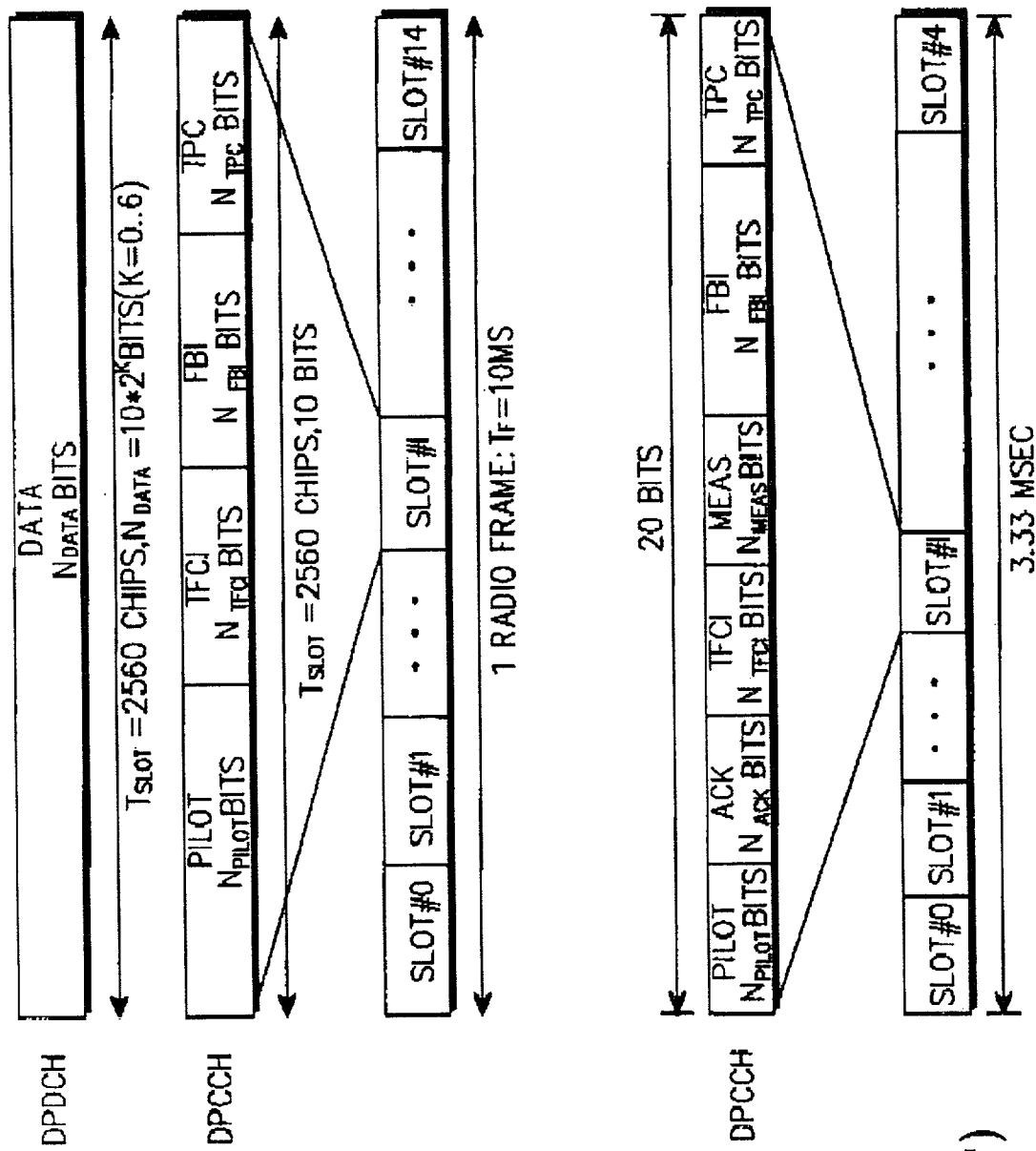
FIG. 9 illustrates the structure of a conventional UL-DPCH.
FIG. 10 illustrates the structure of a conventional UL-DPCCH supporting HSDPA.

Unless the HSDPA UE communicates with the non-HSDPA node B, no compatibility problems arise from transmission of DPCH control information and HSDPA control information on the same UL-DPCCH as illustrated in FIGS. 10 and 11. Based on this idea, if the HSDPA UE does not communicate with the non-HSDPA node B, one UL-DPCCH is used, and if the HSDPA UE communicates also with the non-HSDPA node B, a secondary UL-DPCCH (S-UL-DPCCH) for HSDPA control information and a primary UL-DPCCH (P-UL-DPCCH) for UL-DPDCH control information are used with different channelization codes. The use of a single UL-DPCCH is illustrated in FIGS. 12A, 13A and 14A and the use of different UL-DPCCHs is illustrated in FIGS. 12B, 13B and 14B.

While FIGS. 12A to 14B will be described using one S-DPCCH for transmitting HSDPA control information, n S-DPCCHs can be used likewise. First, a brief description will be made of how to express channelization codes used for DPCCHs. In general, there exist SF OVSF codes with a spreading factor of SF. Then, the OVSF codes can be expressed as $C_{ch,SF,0}$ to $C_{ch,SF,SF-1}$. In FIGS. 12B, 13B, and 14B, a channelization code $C_{Ch,256,0}$ is assigned to a P-UL-DPCCH directed to the non-HSDPA node B.

Figure 12A:
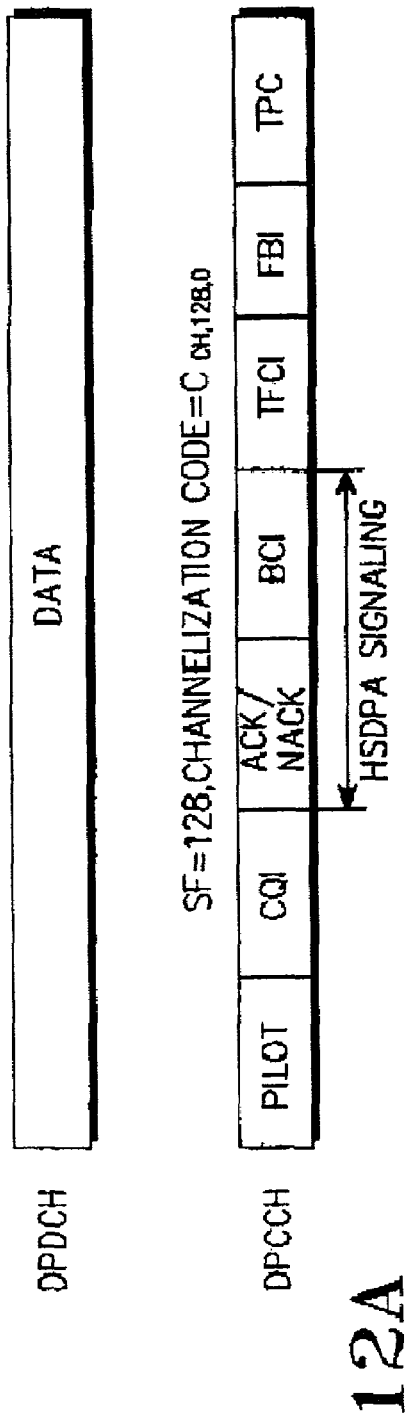
FIGS. 12A and 12B illustrate an embodiment of a UL-DPCH according to the present invention.
Figure 12B:
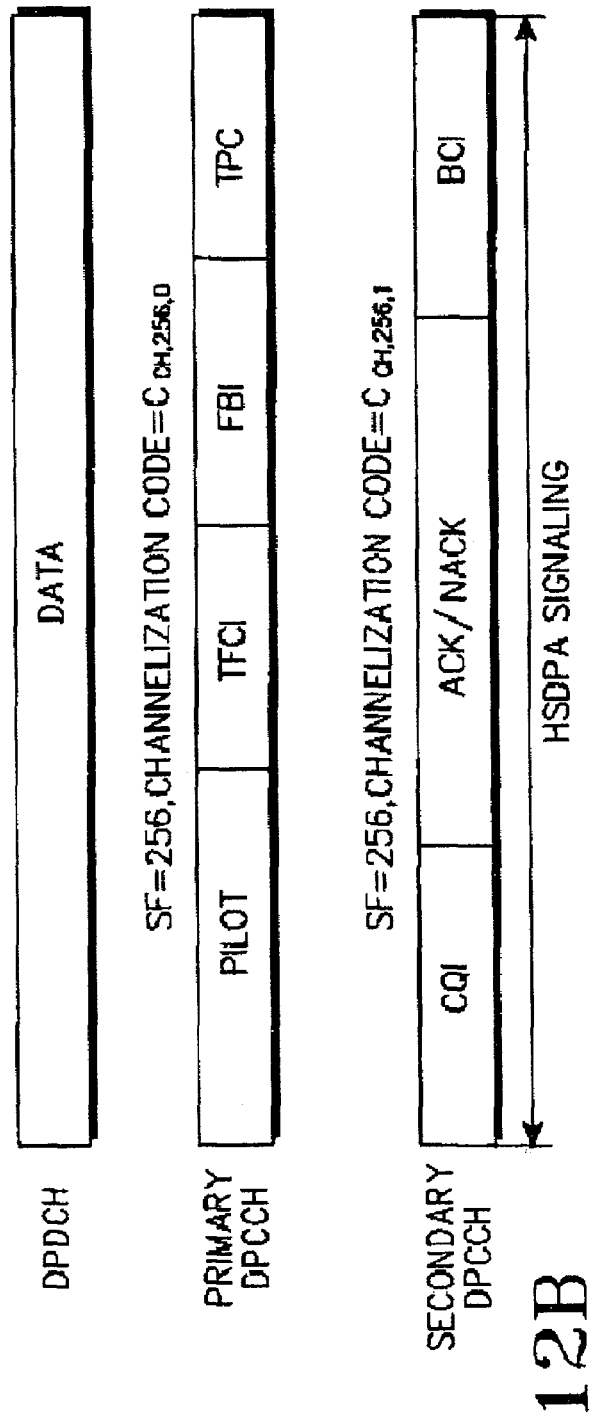

When the HSDPA UE does not communicate with the non-HSDPA node B as illustrated in FIG. 12A, one UL-DPCCH is generated using a channelization code $C_{ch,128,0}$. If the HSDPA UE comes into simultaneous communication with an HSDPA node B and the non-HSDPA node B as illustrated in FIG. 12B, channelization codes $C_{ch,256,1}$ and $C_{ch,256,0}$ are assigned to the S-DPCCH for transmitting HSDPA control information and the P-DPCCH for transmitting DPDCH control information, respectively.

Figure 13A:
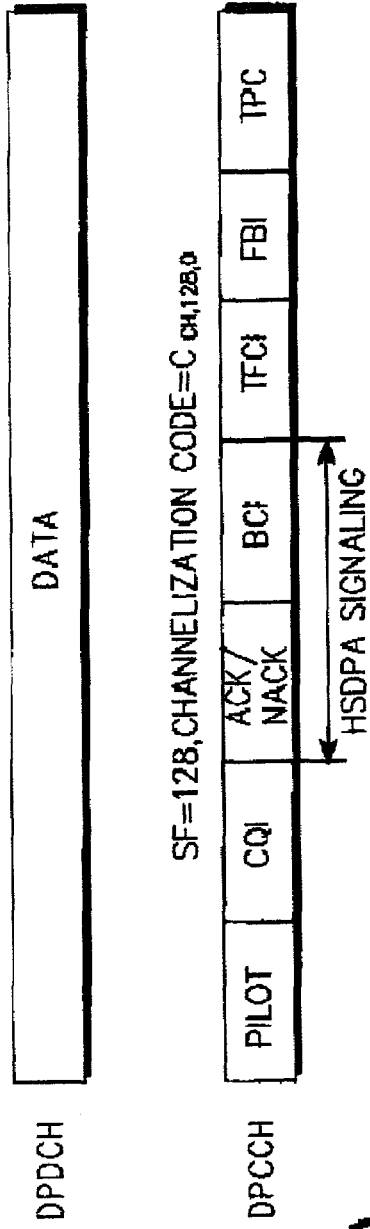
FIGS. 13A and 13B illustrate another embodiment of the UL-DPCH according to the present invention.
Figure 13B:
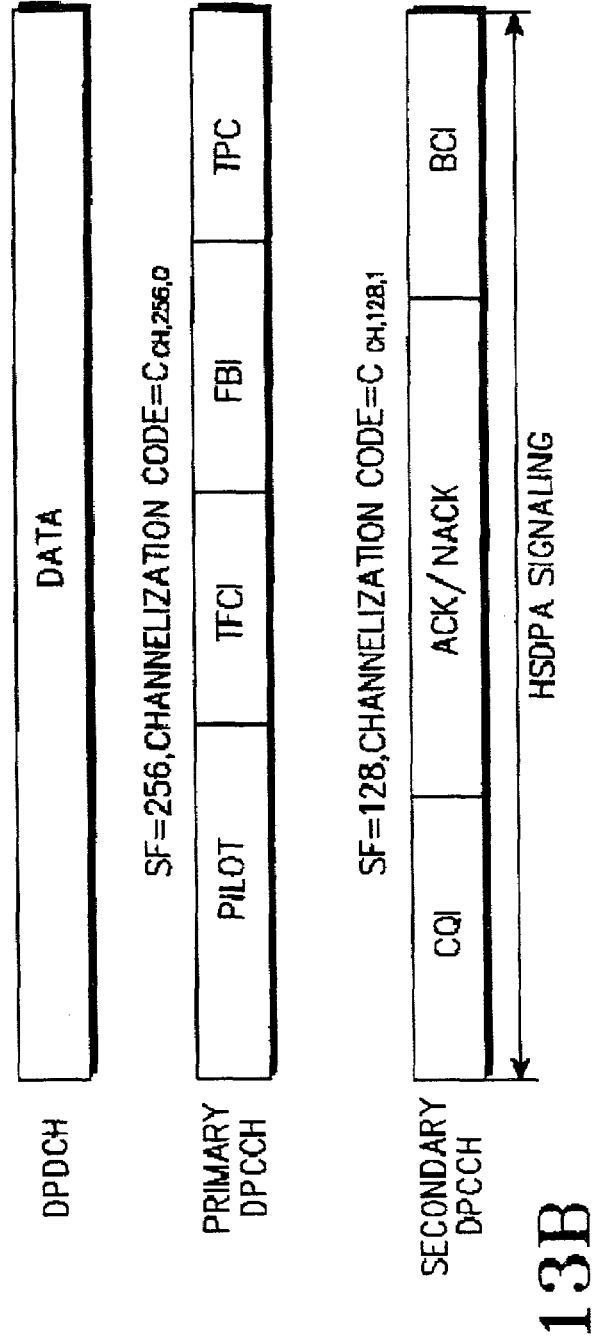
Figure 14A:
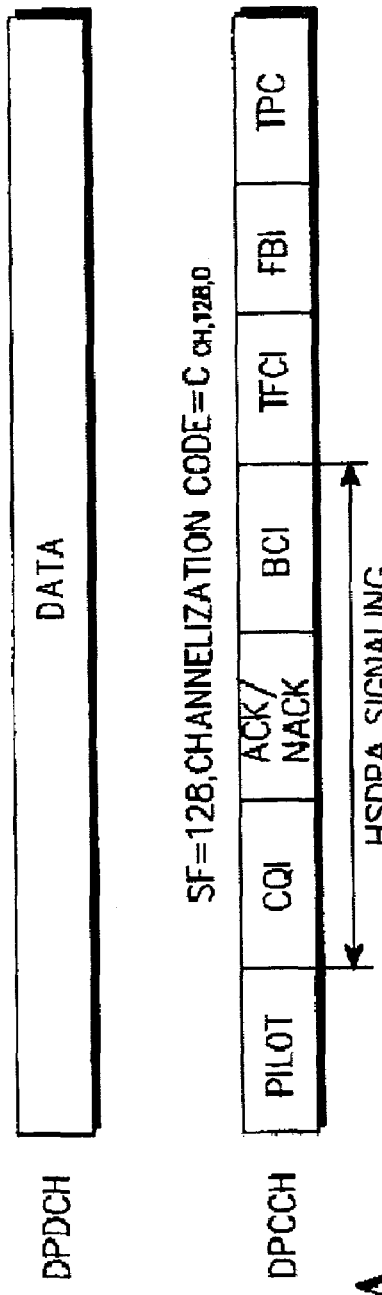
FIGS. 14A and 14B illustrate a third embodiment of the UL-DPCH according to to the present invention.
Figure 14A:
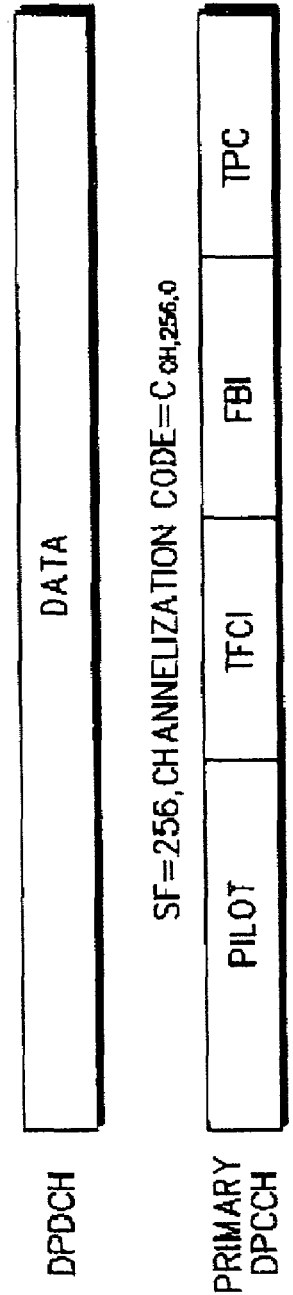
Figure 14B:
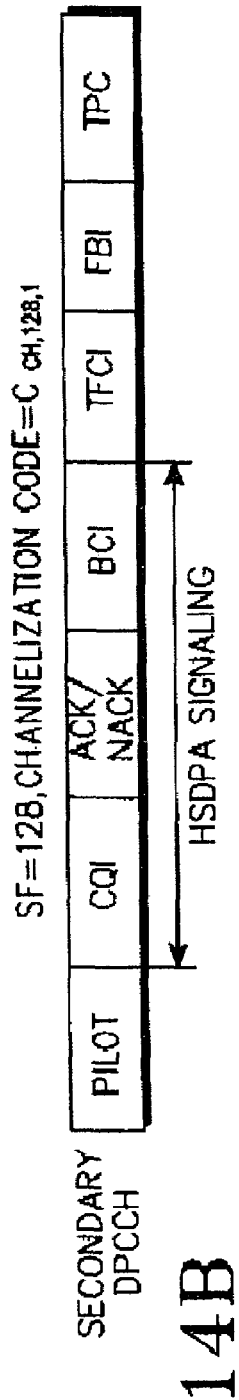

When the HSDPA UE does not communicate with the non-HSDPA node B as illustrated in FIG. 13A, one UL-DPCCH is constructed using the channelization code $C_{ch,128,1}$. If the HSDPA UE comes into simultaneous communication with an HSDPA node B and the non-HSDPA node B as illustrated in FIG. 13B, channelization codes $C_{ch,128,1}$ and $C_{ch,256,0}$ are assigned to the S-DPCCH and the P-DPCCH, respectively. In this case, the channelization codes $C_{ch,128,1}$ and $C_{ch,256,0}$ ensure orthogonality between the P-DPCCH and the S-DPCCH. The HSDPA node B simply uses the modified slot structure without the need for changing the channelization code of the S-DPCCH to receive HSDPA control information.

When the HSDPA UE does not communicate with the non-HSDPA node B as illustrated in FIG. 14A, one UL-DPCCH is constructed using the channelization code $C_{ch,128,1}$. If the HSDPA UE comes into simultaneous communication with an HSDPA node B and the non-HSDPA node B as shown in FIG. 14B, channelization codes $C_{ch,128,1}$ and $C_{ch,256,0}$ are assigned to the S-DPCCH for HSDPA and the P-DPCCH for the DPDCH, respectively. In this case, the S-DPCCH keeps the same slot structure and the SF used before it commences communication with the non-HSDPA node B. The channelization codes $C_{ch,128,1}$ and $C_{ch,256,0}$ ensure orthogonality between the P-DPCCH and the S-DPCCH. The HSDPA node B receives the DPDCH control information and the HSDPA control information without any change.

FIGS. 15A and 15B illustrate a fourth embodiment of the UL-DPCH according to the present invention. One or more UL-DPCCHs for HSDPA are configured using different channelization codes. As illustrated in FIGS. 15A and 15B, DPCH control information is transmitted all the time in a slot structure suitable for reception in the non-HSDPA node B. Therefore, the HSDPA UE maintains the UL-DPCCHs without modifying their slot structures irrespective of whether it communicates with the non-HSDPA node B or not. In FIGS. 15A and 15B, n denotes the number of UL-DPCCHs for transmitting HSDPA control information, that is, the number of HS-DCCHs.

3.2 UL-DPCH transmitter and receiver

Figure 7:
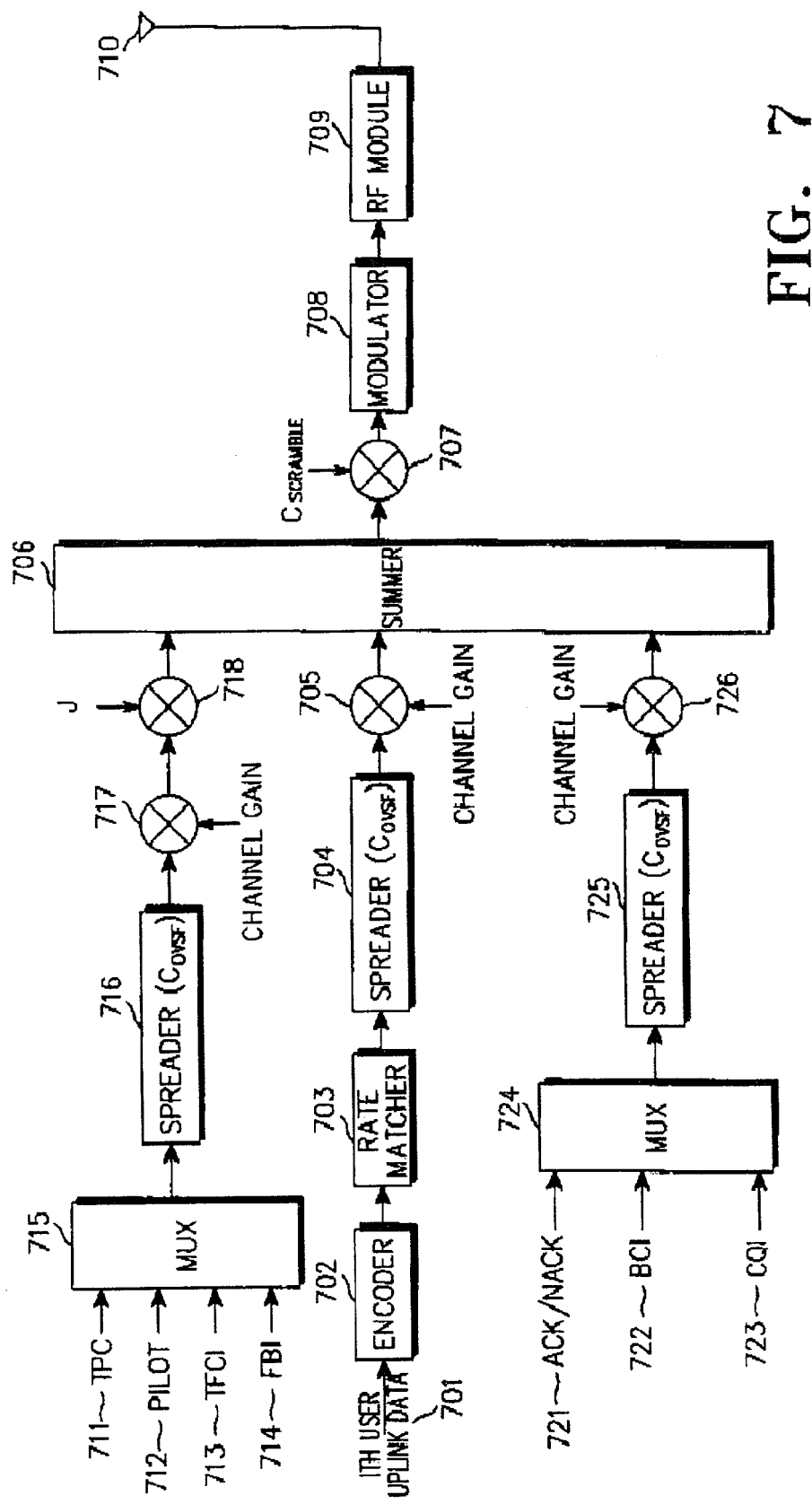
FIG. 7 is a block diagram of a transmitter in a UE according to the present invention.
Figure 8:
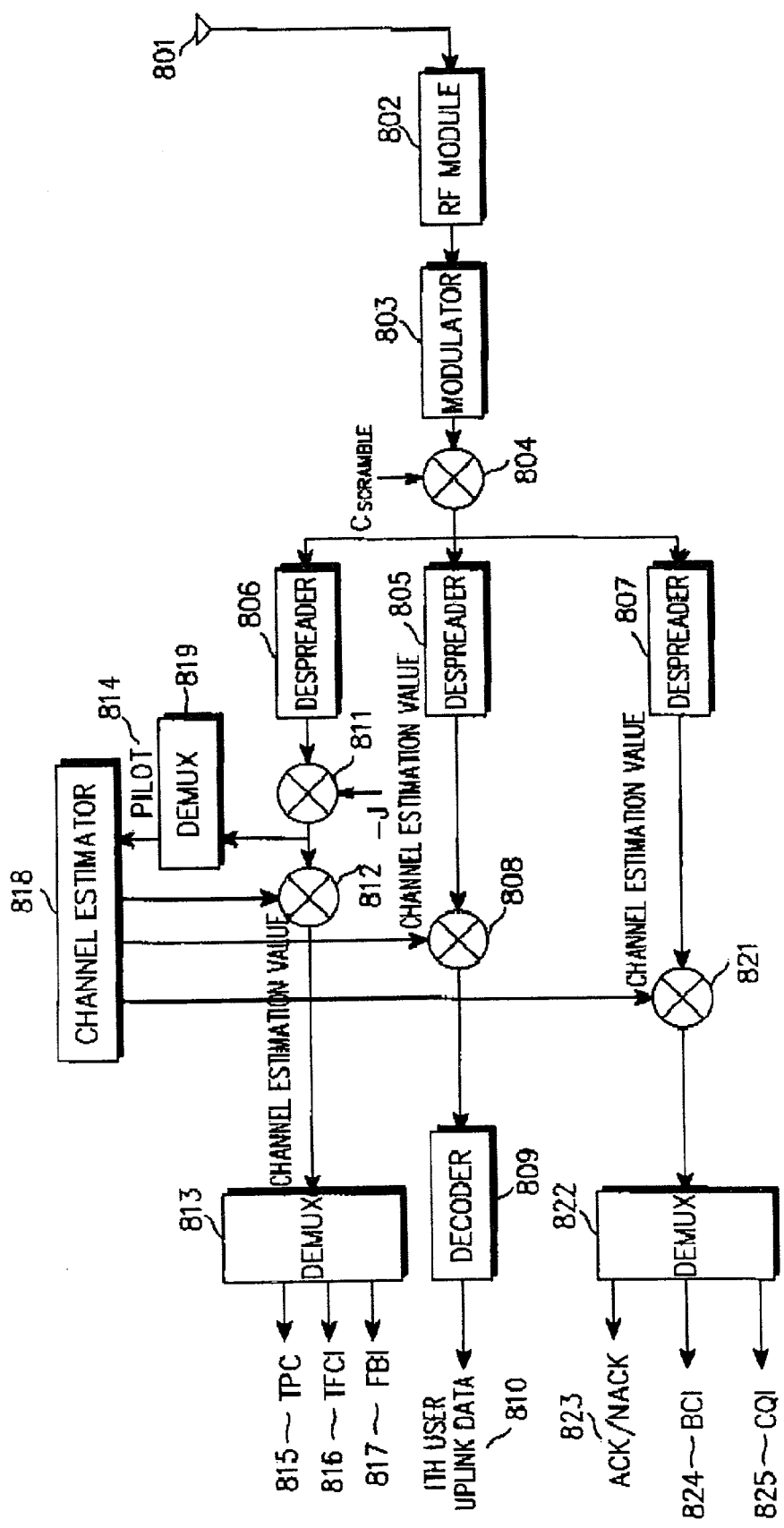
FIG. 8 is a block diagram of a receiver in a node B according to the present invention.

FIGS. 7 and 8 are block diagrams of a UL-DPCH transmitter and a UL-DPCH receiver, respectively, where the HSDPA UE additionally uses a channelization code to transmit HSDPA control information.

The UL-DPCH contains the UL-DPDCH that carries user information and signaling information from a higher layer and the UL-DPCCH that carries control information about the UL-DPDCH. In the present invention, the UL-DPDCH delivers EQS information in addition to the user data.

Referring to FIG. 7, user data and an EQS 701 are channel-encoded by convolutional coding or turbo coding in an encoder 702. The code symbols are matched to a symbol number suitable for transmission on the UL-DPDCH by symbol repetition/puncturing and interleaving in a rate matcher 703. The rate-matched data is spread with a predetermined channelization code in a spreader 704. The channelization code is an orthogonal code and has a code length varying depending on its SF. The length of the channelization code ranges from 4 to 256 and a higher data rate is produced when the SF of the channelization code is lower. The spread user data is multiplied by a channel gain in a multiplier 705. The channel gain is a parameter determining the transmission power of the UL-DPDCH. In general, a higher channel gain is applied when an SF is lower. The output of the multiplier 705 is fed to a summer 706.

A TPC 711, a pilot 712, a TFCI 713, and an FBI 714 are multiplexed in a multiplexer (MUX) 715, to thereby form a UL-DPCCH. The TPC 711 is a command to control the transmission power of a downlink transport channel. The pilot 712 is used for the node B to estimate the reverse channel condition and estimate uplink channels. The TFCI 713 contains control information about diverse user data transmitted on the DPDCH. For example, if the DL-DPDCH delivers voice information and packet information simultaneously, the TFCI 713 indicates the TFC of the data that aids the node B in correctly interpreting the UL-DPDCH. The FBI 714 functions to reduce an antenna gain in closed-loop transmit antenna diversity for UMTS, or interference in an SHR. That is, the FBI 714 provides feedback information for SSDT (Site Selection Diversity), which is adopted when one node B communicates with one UE.

The multiplexed signal is spread with the channelization code of the UL-DPCCH in a spreader 716. The spread signal is multiplied by a channel gain related with the transmission power of the UL-DPCCH in a multiplier 717 and then by a complex number j in a multiplier 718. The reason for multiplying the complex number j by the UL-DPCCH is to discriminate between the product and the UL-DPDCH as an imaginary part and a real part and thus reduce the occurrences of zero crossing in a constellation at a radio frequency. Another reason is to reduce a PTAR (Peak To Average Ratio) in the transmitter. If zero crossing occurs in a constellation at a radio frequency, the PTAR becomes higher and adversely affects the UE transmitter, as is well known. The imaginary-valued UL-DPCCH is fed to the summer 706.

A MUX 724 multiplexes HSDPA control information including an ACK/NACK 721, a BCI 722, and a CQI 723. The resulting UL-DPCCH is called an S-UL-DPCCH to be discriminated against the UL-DPCCH generated in the MUX 715, which is called a P-UL-DPCCH. The S-UL-DPCCH transmits a control signal in response to received data having a TTI of 1 slot, 3 slots, 5 slots, 10 slots, or 15 slots. The P-UL-DPCCH transmits a control signal in response to a downlink channel signal having a TTI of 15 or more slots. The S-UL-DPCCH is spread with a corresponding spreading code in a spreader 725 and multiplied by a channel gain related with the transmission power of the S-UL-DPCCH in a multiplier 726. The product is applied to the input of the summer 706. The summer 706 sums the UL-DPDCH, the P-UL-DPCCH, and the S-UL-DPCCH.

As described above, the P-UL-DPCCH is multiplied by the complex number j and as a result, it is imaginary-valued. Therefore, even if the imaginary-valued P-UL-DPCCH is added to the S-UL-DPCCH, their characteristics are kept intact. While the UL-DPDCH and the S-UL-DPCCH have real values, they are spread with different channelization codes. Therefore, their mutual influences disappear during despreading at a receiver. The sum of the S-UL-DPCCH and the UL-DPDCH is transmitted on an I channel and the P-UL-DPCCH is transmitted on a Q channel because the UL-DPDCH is not transmitted in the absence of user information or signaling from a higher layer. If the UL-DPCCHs are both transmitted on the Q channel in the absence of the UL-DPDCH, the zero crossing probability increases. This means that the PTAR of the transmitter may be increased.

The sum in the form of an I+J signal is scrambled with a complex-valued scrambling code for the UE in a multiplier 707, modulated in a modulator 708, converted to a carrier frequency signal in an RF module 709, and transmitted to the node B via an antenna 710. The uplink scrambling code is a complex code generated from a Gold code for use in identifying the UE in UMTS. This uplink scrambling code is also used to descramble the transmitted signal in the node B.

The UE transmitter works with the slot structure illustrated in FIG. 4. If the slot structures illustrated in FIGS. 5 and 6 are adopted, the ACK/NACK 721, the BCI 722, and the CQI 723 are spread with different channelization codes and multiplied by different channel gains. To work with the slot structures of FIGS. 5 and 6, the UE transmitter further includes as many spreaders as needed. When the ACK/NACK 721, the BCI 722, and the CQI 723 are transmitted with different channelization codes, I and Q channel transmission can be carried out in many ways. For example, ACK/NACK is transmitted on the I channel and the BCI and CQI are transmitted on the Q channel.

FIG. 8 is a block diagram of a node B receiver for receiving the UL-DPCH from the UE receiver illustrated in FIG. 7. Referring to FIG. 8, an uplink signal received via an antenna 801 is converted to a baseband signal in an RF module 802. The baseband signal is demodulated in a demodulator 803 and descrambled with a scrambling code in a multiplier 804. The scrambling code is the same code as used in the multiplier 707 of FIG. 7. The descrambling serves to identify a signal from the particular UE.

The descrambled signal is despread in despreaders 805, 806 and 807. The descrambling and the despreading can be performed contemporaneously. The same channelization codes as used in the spreaders 704, 716 and 725 are applied to the despreaders 805, 806 and 807, respectively. As described in connection with FIG. 7, since the channelization codes are orthogonal codes, the despread signals are identified as the UL-DPDCH, the P-UL-DPCCH, and the S-UL-DPCCH. The P-UL-DPCCH is multiplied by −j to be recovered to the original real-valued signal in a multiplier 811. Because the P-UL-DPCCH is imaginary-valued by multiplication by j, it can be recovered by multiplying the imaginary-valued signal by −j. The recovered P-UL-DPCCH is applied to a DEMUX 819 and a multiplier 812. The DEMUX 819 extracts a pilot signal 814 from the P-UL-DPCCH signal and a channel estimator 818 estimates the channel condition between the UE and the node B by the pilot signal 814. Meanwhile, the channel estimator 818 calculates a channel estimation value, that is, a compensation value for the estimated channel condition and feeds it to multipliers 808, 812 and 821. The multiplier 812 multiplies the channel estimation value by the P-UL-DPCCH received from the multiplier 822, for channel compensation. A DEMUX 813 demultiplexes the channel-compensated P-UL-DPCCH into a TPC 815, a TFCI 816, and an FBI 817. The TPC 815 is used for downlink transmission power control and the TFCI 816 is used for interpreting the UL-DPDCH. The FBI 817 is used in adjusting the gain of a closed-loop transmit antenna, or for SSDT.

The spreader 805 despreads the output of the multiplier 804, thereby recovering the UL-DPDCH eliminating the other signals. The multiplier 808 multiplies the recovered UL-DPDCH by the channel estimation value and a decoder 809 decodes the channel-compensated UL-DPDCH signal by convolutional decoding or turbo decoding. The resulting user information or a signaling signal is delivered to a higher layer.

The despreader 807 despreads the output of the multiplier 804, thereby recovering the S-UL-DPDCH eliminating the other signals. The multiplier 821 multiplies the recovered S-UL-DPDCH by the channel estimation value and a DEMUX 822 demultiplexes the channel-compensated S-UL-DPCCH in to an ACK/NACK 823, a BCI 824, and a CQI 825.

The node B receiver illustrated in FIG. 8 works with the slot structure illustrated in FIG. 4. To work with the slot structures illustrated in FIGS. 5 and 6, the node B receiver should have as many despreaders as the number of channelization codes assigned to the UE.

4. DL-DPCH and SHCCH 4.1 Structures of DL-DPCH and SHCCH

FIGS. 17 to 21 illustrate embodiments of the DL-DPCH for simultaneous support of an HSDPA service on the HS-DSCH and data transmission on the DL-DPDCH according to the present invention.

Figure 16:
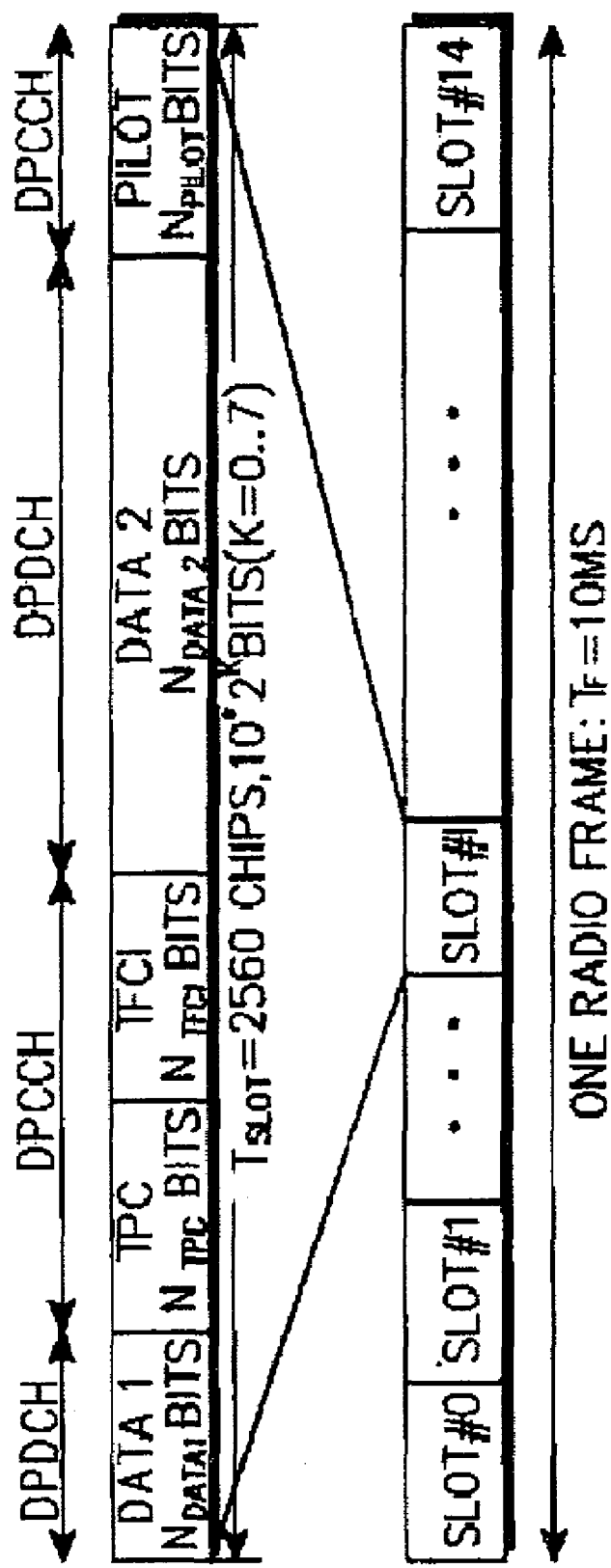
FIG. 16 illustrates the structure of a conventional DL-DPCH.
Figure 17:
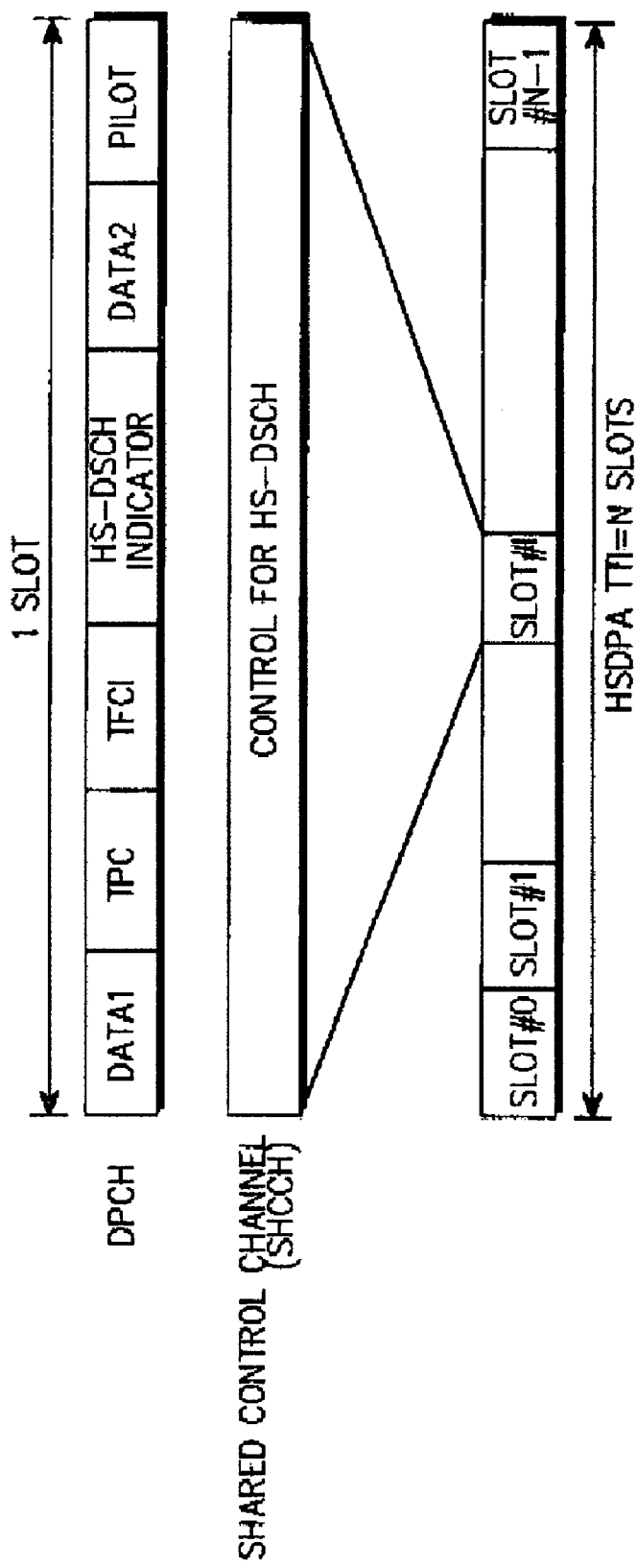
FIG. 17 illustrates an embodiment of a UL-DPCH and an SHCCH that carries downlink HSDPA control information according to the present invention.

FIG. 17 illustrates an embodiment of the DL-DPCH and the shared control channel (SHCCH) that carries HSDPA control information according to the present invention. Referring to FIG. 17, an HSDPA TTI is comprised of N slots and each slot contains the DL-DPCH and the SHCCH. The DL-DPCH has an HS-DSCH indicator in part of the second data field Data2 in the conventional DL-DPCH structure illustrated in FIG. 16. The HS-DSCH indicator indicates whether the HS-DSCH carries an HSDPA data packet for a particular UE. Therefore, UEs receive their HSDPA data packets on the HS-DSCH by checking the HS-DSCH indicator on the DL-DPCH.

Control information needed to control the HS-DSCH (hereinafter referred to as HS-DSCH control information) is transmitted to a UE on the SHCCH. The HS-DSCH control information contains an MCS level, an HS-DSCH channelization code, a HARQ process number, and a HARQ packet number. One or more channelization codes can be assigned to the SHCCH.

Therefore, the HS-DSCH indicator contains information about one or more channelization codes assigned to the SHCCH carrying the HS-DSCH control information as well as information indicating whether an HSDPA data packet for the UE exists or not. The channelization code information is provided only when the HSDPA data packet exists. When necessary, part of the HS-DSCH control information (e.g., MCS level) can be transmitted by the HS-DSCH indicator.

The HS-DSCH indicator can be transmitted on the DL-DPCH in two ways. One approach is to send the HS-DSCH indicator in a predetermined number of (N) slots. As illustrated in FIG. 17, if a fixed slot structure is adopted for each slot of a TTI, the HS-DSCH indicator is sent in N slots. Here, it is assumed that the HSDPA data packet is transmitted in an N-slot basis (HSDPA TTI).

Figure 21:
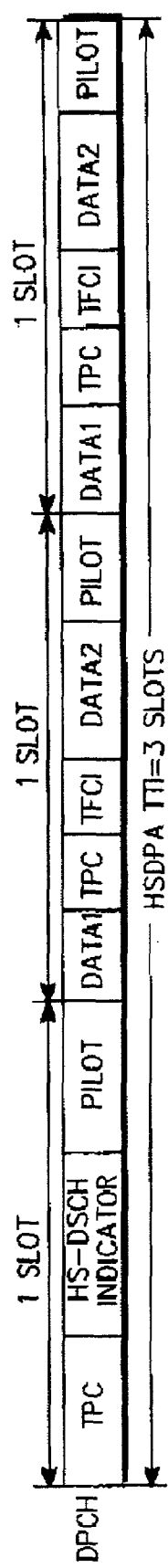
FIG. 21 illustrates another embodiment of the UL-DPCH according to the present invention.

Alternatively, the HS-DSCH indicator may be sent in one of the TTI slots so that the UE processes it substantially. The conventional slot structure is adopted in the other slots of the TTI. In this case, different slot structures are employed within a TTI as illustrated in FIG. 21. In FIG. 21, there are no data fields of Data1 and Data2 in the HS-DSCH indicator-carrying slot to transmit the HS-DSCH indicator fully in one slot. Application of different slot structures within a TTI leads to more efficient system operation in transmitting the HS-DSCH indicator and data.

Figure 18:
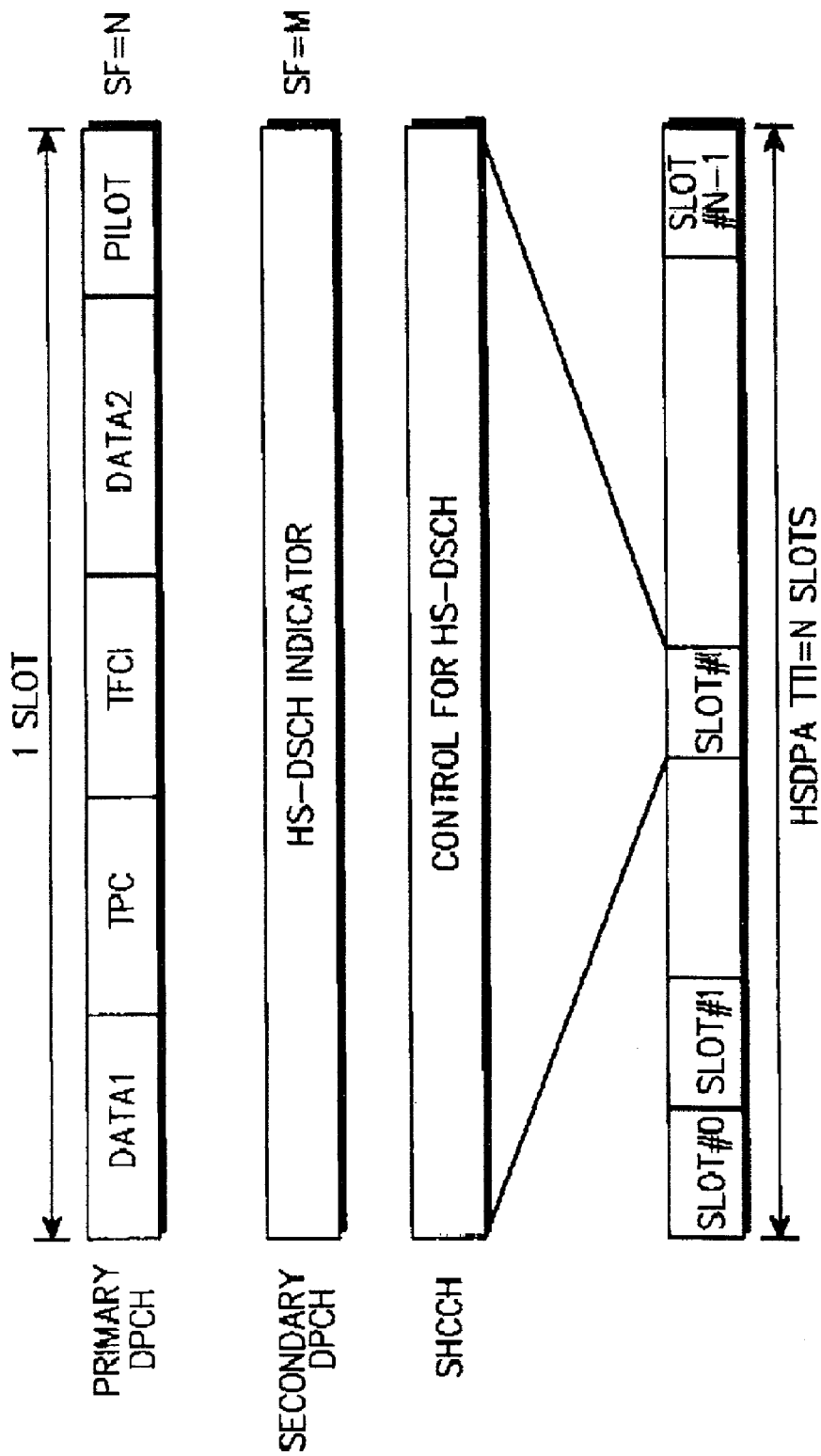
FIG. 18 illustrates another embodiment of the UL-DPCH and the SHCCH that carries downlink HSDPA control information according to the present invention.

FIG. 18 illustrates another embodiment of the DL-DPCH and the SHCCH according to the present invention. Referring to FIG. 18, two DL-DPCHs are configured. One of them is a novel DL-DPCH for transmitting the HS-DSCH indicator related with HSDPA, called a secondary DL-DPCH (S-DL-DPCH). The secondary DL-DPCH is assigned to a different channelization code from that for the conventional DL-DPCH called a primary DPCH (P-DL-DPCH). Since the S-DL-DPCH and the P-DL-DPCH transmit different amounts of information, different SFs should be assigned to them. As illustrated in FIG. 18, SF=N for the P-DPCH and SF=M for the S-DPCH. For example, if the information amount of the HS-DSCH indicator in each slot is small, a very large SF, for example, 512 can be assigned to the S-DL-DPCH to increase the use efficiency of a downlink channelization code. The P-DL-DPCH contains the same fields as the DL-DPCH transmitted by a non-HSDPA node B. Thus, the P-DL-DPCH is identical to the conventional DL-DPCH in slot structure. Here, the UE can adopt the same finger structure for the P-DPCH and the conventional DPCH.

In the 3GPP Release 99 specification, a TFCI for the DL-DPDCH and a TFCI for the DL-DSCH are filled in the first and latter parts of the TFCI field, respectively in the DL-DPCH. If the HSDPA node B sends an HSDPA data packet to the UE on the HS-DSCH, no packet service is provided on the DSCH defined by Release 99. Therefore, with the conventional DL-DPCH channel structure maintained, a TFCI portion assigned to the DPDCH in the Release 99 specification is used for the DL-DPDCH and the remaining TFCI portion assigned to the DSCH in the R-99 specification is used for transmitting the HS-DSCH indicator in order to support HSDPA. When the non-HSDPA node B adopts the slot structure illustrated in FIG. 19 to transmit the DL-DPCH, the UE can combine radio links. It should be noted here, that the non-HSDPA node B should set DTX (Discontinuous Transmission) in the place of the HS-DSCH indicator in each slot.

4.2 Receiver for Double Uses

Figure 20:
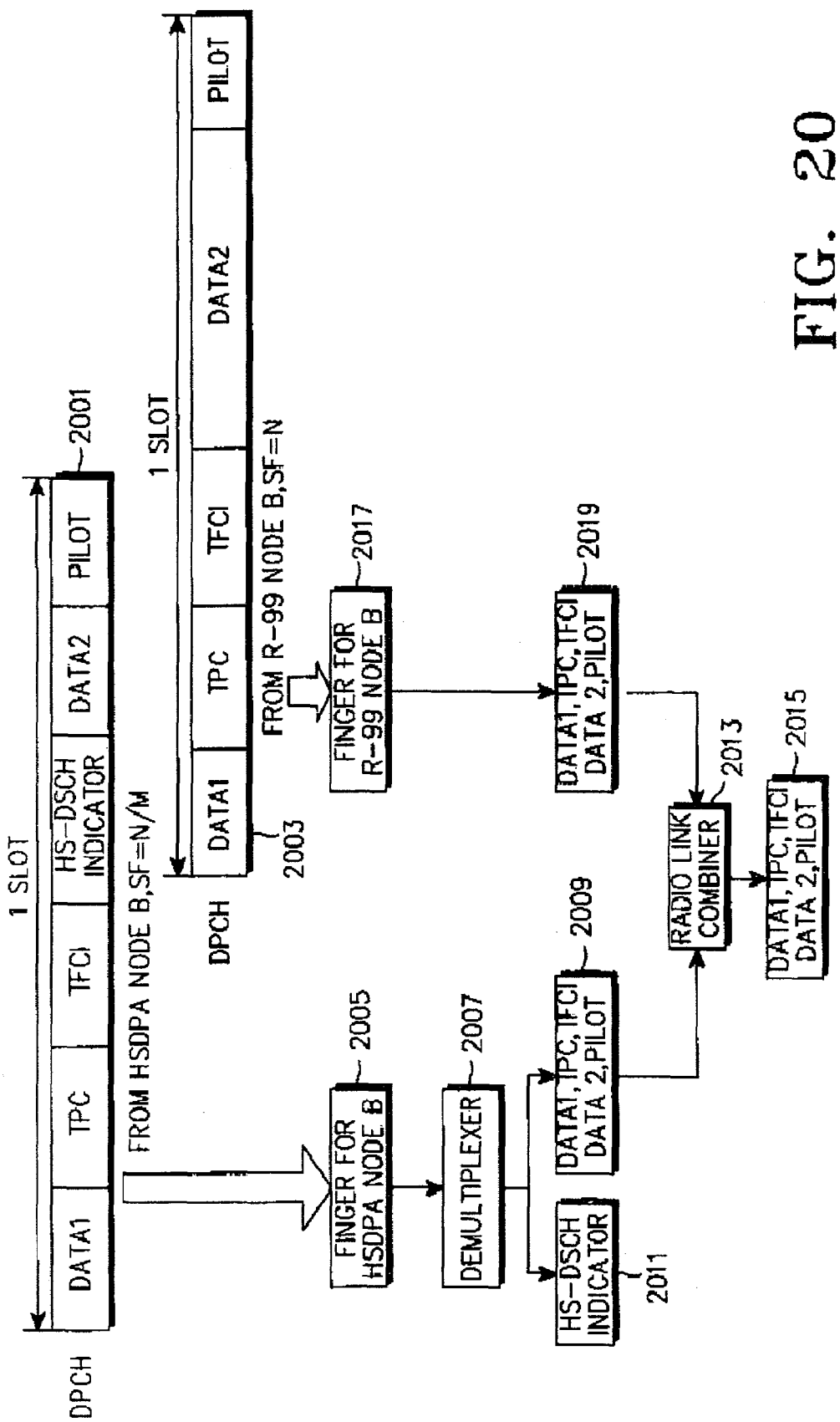
FIG. 20 is a block diagram of a receiver in the UE for simultaneously receiving downlink signals from an HSDPA node B and a non-HSDPA node B according to the present invention.

FIG. 20 is a block diagram of a UE receiver for receiving DL-DPCHs from an HSDPA node B adopting the slot structure illustrated in FIG. 17 and from a non-HSDPA node B adopting the slot structure illustrated in FIG. 16. When the HSDPA node B and the non-HSDPA node B send the same data in the data fields Data1 and Data2 on DL-DPCHs, they use different SF values. That is, the non-HSDPA node B uses a channelization code with SF=N, the HSDPA node B should use an SF less than N (e.g., SF=N/m) to additionally send the HS-DSCH indicator.

Referring to FIG. 20, a signal 2001 with SF=N/m from the HSDPA node B is applied to the input of a finger 2005, and a signal 2003 with SF=N from the non-HSDPA node B is applied to the input of a finger 2017. The output signal of the finger 2005 is demultiplexed into an HS-DSCH indicator 2011 and information 2009 (Data1, TPC, TFCI, Data2, and Pilot) in a DEMUX 2007. Information 2019 (Data1, TPC, TFCI, Data2, and Pilot) output from the finger 2017 is combined with the information output from the DEMUX 2007 in a radio link combiner 2013. The radio link combiner 2013 outputs information 2015 containing Data1, TPC, TFCI, Data2, and Pilot. The pilot signal is used to estimate downlink channels from the HSDPA node B and the non-HSDPA node B, for radio link combination in the radio link combiner 2013.

4.3 DL-DPCH transmitter and receiver 4.3.1 First Embodiment

Figure 19:
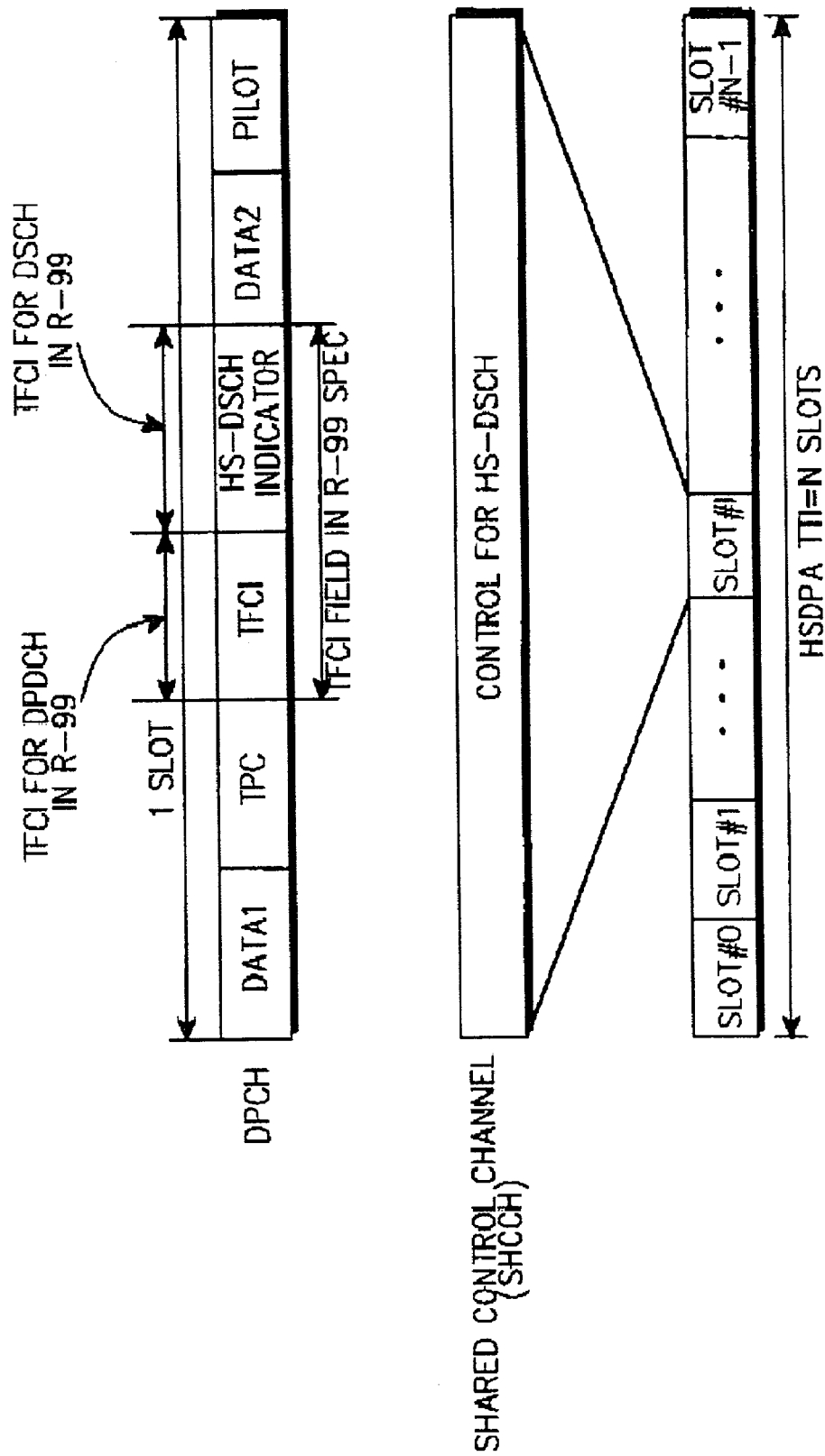
FIG. 19 illustrates a third embodiment of the UL-DPCH and the SHCCH that carries downlink HSDPA control information according to the present invention.
Figure 22:
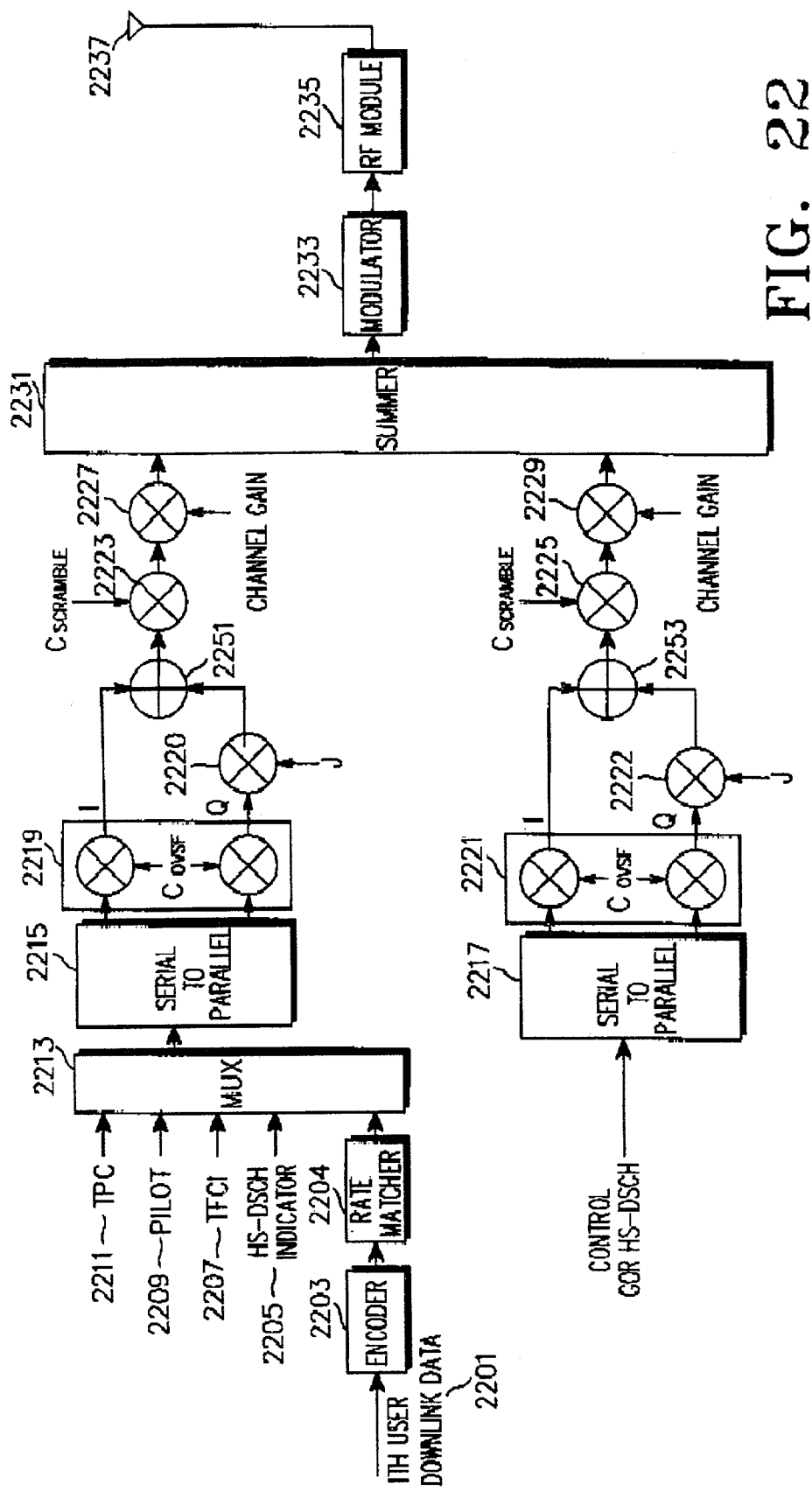
FIG. 22 is a block diagram of an embodiment of a transmitter in the node B for transmitting a UL-DPCH and an SHCCH according to the present invention.
Figure 23:
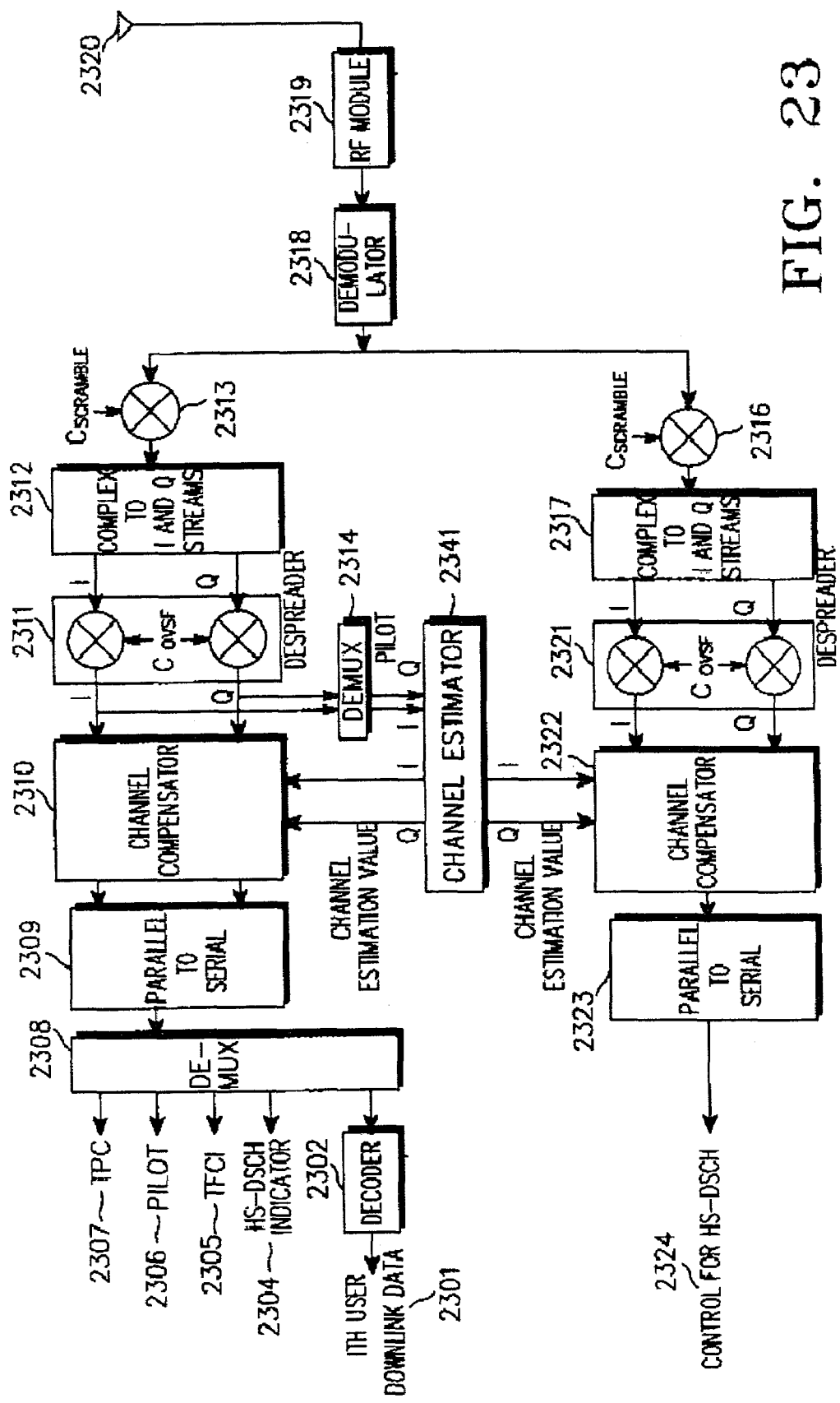
FIG. 23 is a block diagram of a receiver in the UE for receiving a UL-DPCH and an SHCCH from the transmitter illustrated in FIG. 22.

FIGS. 22 and 23 are block diagrams of a DL-DPCH transmitter and a DL-DPCH receiver where the HS-DSCH indicator and control information defined by Release 99 containing Data1, TPC, TFCI, Data2, and Pilot are transmitted on a single DL-DPCH as illustrated in FIGS. 17, 19 and 21.

Referring to FIG. 22, DL-DPCH data 2201 is channel-encoded in an encoder 2203 and matched to the number of bits transmittable on a physical channel in a rate matcher 2204. A MUX 2213 multiplexes the rate-matched data together with an HS-DSCH indicator 2205, a TFCI 2207, a Pilot 2209, and a TPC 2211 and outputs one bit stream. For the input of the bit stream, a serial-to-parallel converter (SPC) 2215 generates two bit streams. A spreader 2219 spreads the two bit streams with the same channelization code so that the spread signal is orthogonal to signals spread with different channelization codes. One complex bit stream (Q signal) is generated by multiplying one of the two bit streams output from the spreader 2219 j in a multiplier 2220. The Q signal output from the multiplier 2220 and the I signal output from the spreader 2219 are added in an adder 2251. The bit stream output from the adder 2251 is multiplied by a complex scrambling code $C_{SCRAMBLE}$ on a chip basis in a scrambler 2223. The scrambled signal is multiplied by a channel gain in a multiplier 2227, for channel compensation. Meanwhile, an SHCCH transmitter is also illustrated in FIG. 22. HS-DSCH control information 2214 is converted to two bit streams in an SPC 2217 and spread with the same channelization code in a spreader 2221. One complex bit stream (Q signal) is generated by multiplying one of the two spread bit streams by j in a multiplier 2222. The Q signal output from the multiplier 2222 and the I signal output from the spreader 2221 are added in an adder 2253. The bit stream output from the adder 2253 is multiplied by a complex scrambling code $C_{SCRAMBLE}$ on a chip basis in a scrambler 2225. The scrambled signal is multiplied by a channel gain in a multiplier 2229, for channel compensation. A summer 2231 adds the DL-DPCH received from the multiplier 2227 and the SHCCH received from the multiplier 2229. The sum is modulated in a modulator 2233, converted to an RF signal in an RF module 2235, and then transmitted via an antenna 2237. While the transmitter illustrated in FIG. 22 scrambles the DL-DPCH and the SHCCH with different scrambling codes, the same scrambling code and different channelization codes can be used for the two channels.

FIG. 23 is a block diagram of a UE receiver for receiving a DL-DPCH from the node B transmitter illustrated in FIG. 22. Referring to FIG. 23, an RF signal received via an antenna 2320 is converted to a baseband signal in an RF module 2319. The baseband signal is demodulated in a demodulator 2318 and fed to two descramblers 2313 and 2316. The descrambler 2313 descrambles the demodulated signal with a predetermined complex scrambling code $C_{SCRAMBLE}$ and outputs a DL-DPCH signal. The descrambler 2316 descrambles the demodulated signal with another predetermined complex scrambling code $C_{SCRAMBLE}$ and outputs an SHCCH signal. The complex-valued DL-DPCH signal is separated into a real signal I and an imaginary signal Q in a complexer 2312. The I and Q signals are multiplied by a channelization code COVSF, for despreading in a despreader 2311. The complex-valued SHCCH signal is separated into a real signal I and an imaginary signal Q in a complexer 2317. The I and Q signals are multiplied by another channelization code $C_{OVSF}$, for despreading in a despreader 2321. A DEMUX 2314 extracts a pilot signal from the I and Q signals received from the despreader 2311. A channel estimator 2341 calculates a channel estimation value by estimating radio channel distortion from the pilot signal. A channel compensator 2310 compensates for the radio channel distortion of the I and Q signals of the DL-DPCH received from the despreader 2311 using the channel estimation value, and outputs the DL-DPCH data in two bit streams. A channel compensator 2322 compensates for the radio channel distortion of the I and Q signals of the SHCCH received from the despreader 2321 using the channel estimation value and outputs the SHCCH data in two bit streams. A parallel-to-serial converter (PSC) 2323 converts the two bit streams of the SHCCH data received from the channel compensator 2322 to one bit stream and outputs final HS-DSCH control information 2324. A PSC 2309 converts the two bit streams of the DL-DPCH data received from the channel compensator 2310 to one bit stream. A DEMUX 2308 demultiplexes the bit stream of the DL-DPCH to a TPC 2307, a Pilot 2306, a TFCI 2305, and an HS-DSCH indicator 2304. The DEMUX 2308 also outputs a downlink data signal. The downlink data signal is decoded to downlink data 2301 in a decoder 2303. While radio channels are estimated using the pilot signal received on the DL-DPCH in the receiver illustrated in FIG. 23, the channel estimation is carried out using a pilot signal received on a downlink common channel.

4.3.1 Second Embodiment

Figure 24:
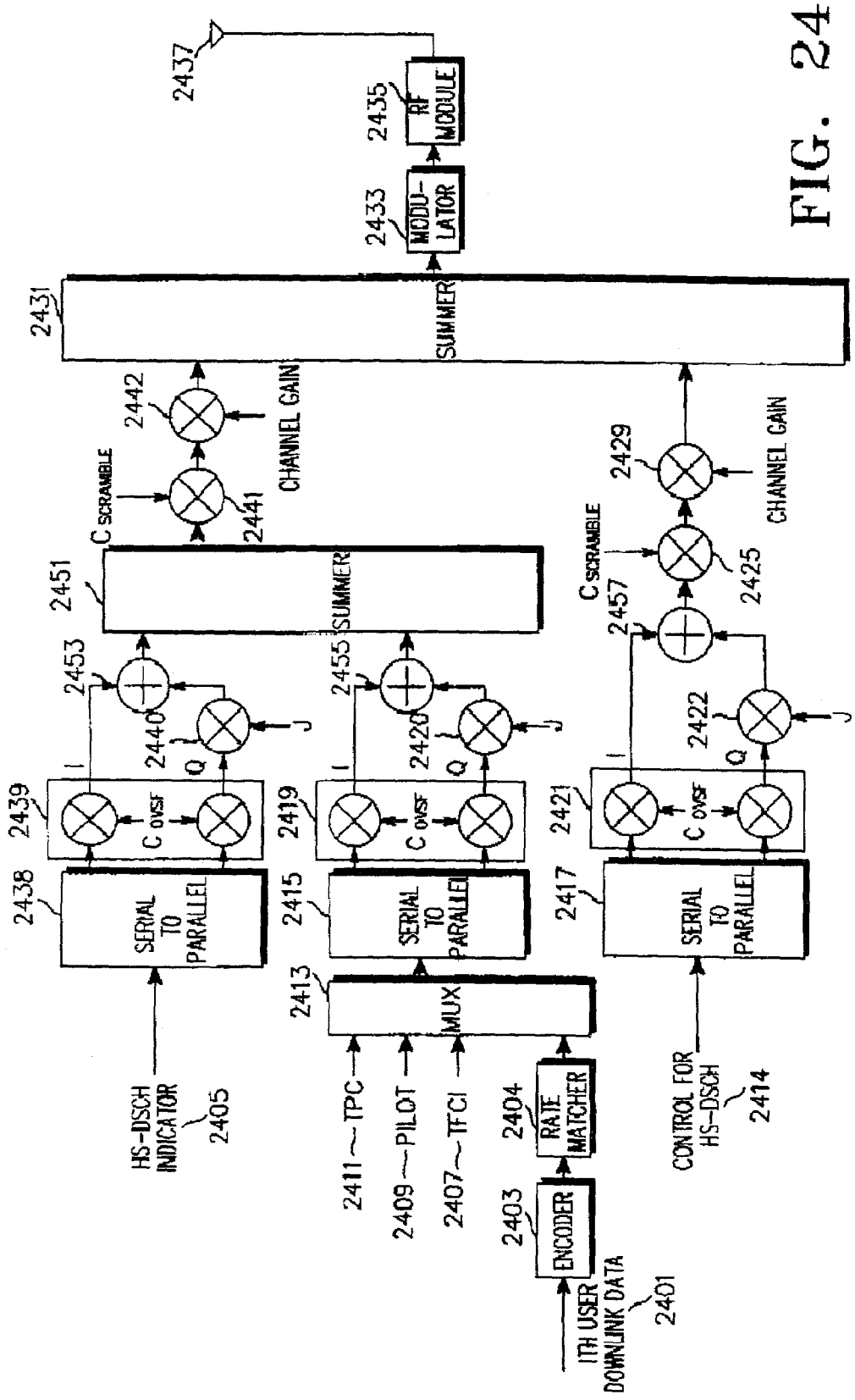
FIG. 24 is a block diagram of another embodiment of the transmitter in the node B for transmitting a UL-DPCH and an SHCCH according to the present invention.
Figure 25:
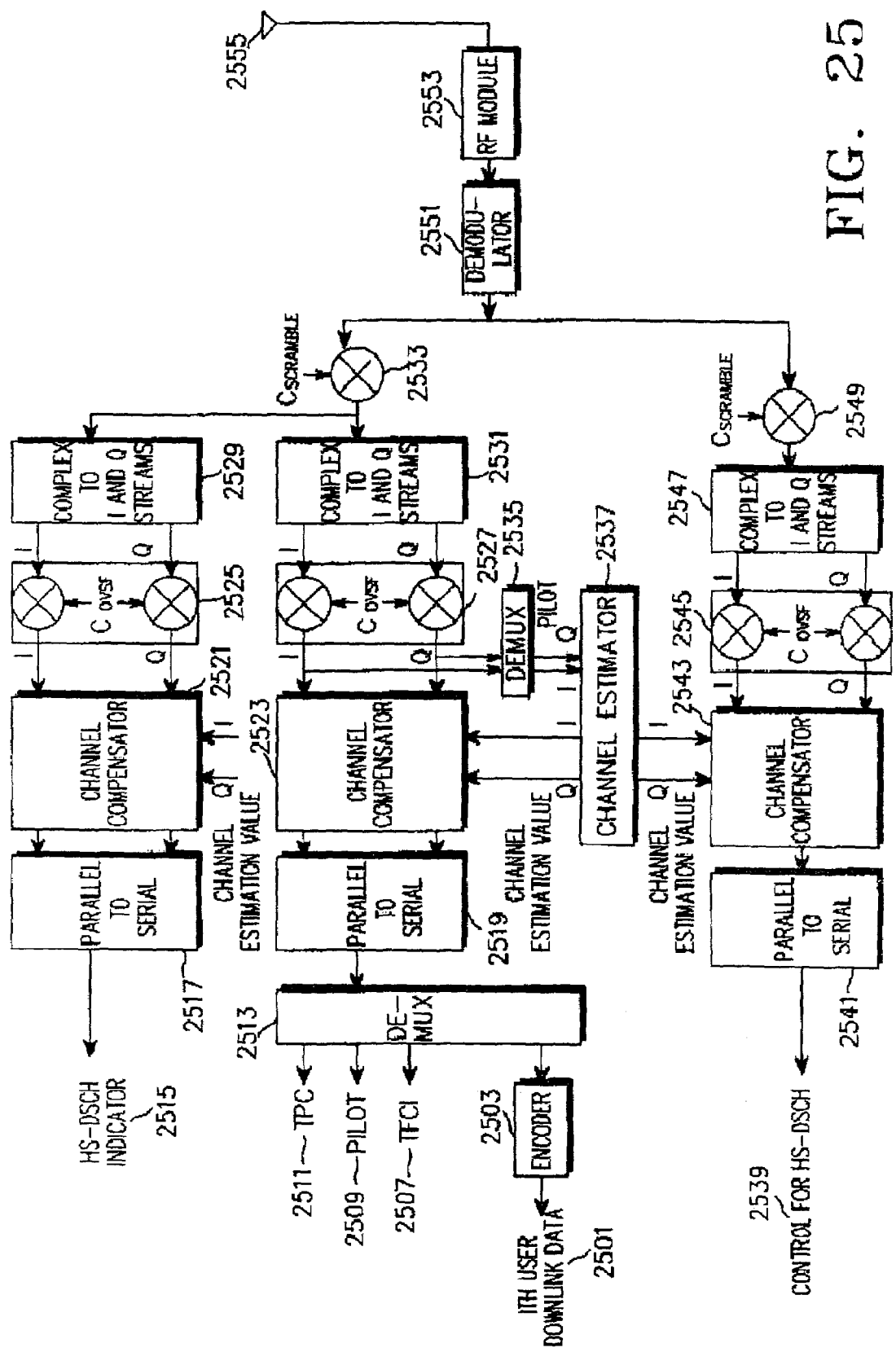
FIG. 25 is a block diagram of a receiver in the UE for receiving a UL-DPCH and an SHCCH from the transmitter illustrated in FIG. 24.

FIGS. 24 and 25 are block diagrams of a DL-DPCH transmitter and a DL-DPCH receiver where a P-DL-DPCH having the non-HSDPA slot structure and an S-DL-DPCH for transmitting the HS-DSCH indicator are generated as illustrated in FIG. 18. The control information of Data1, TPC, TFCI, Data2, and Pilot defined by Release 99 is sent on the P-DL-DPCH.

Referring to FIG. 24, DL-DPCH data 2401 is channel-encoded in an encoder 2403 and matched to the number of bits transmittable on a physical channel by repetition or puncturing in a rate matcher 2404. A MUX 2413 multiplexes the rate-matched data together with a TFCI 2407, a Pilot 2409, and a TPC 2411 and outputs one bit stream. For the input of the bit stream, an SPC 2415 generates two bit streams. A spreader 2419 spreads the two bit streams with the same channelization code so that the spread signal is orthogonal to signals spread with different channelization codes. One complex bit stream (Q signal) is generated by multiplying one of the two bit streams output from the spreader 2419 by j in a multiplier 2420. The Q signal output from the multiplier 2420 and the I signal output from the spreader 2429 are added to one complex bit stream in an adder 2455. Meanwhile, an HS-DSCH indicator 2405 is converted to two bit streams in an SPC 2438. The two bit streams are spread with the same channelization code in a spreader 2439. The channelization code is different from a channelization code used for the P-DL-DPCH in a spreader 2419. One of the two spread bit streams output from the spreader 2438, that is, the Q signal is imaginary-valued through multiplication by j in a multiplier 2440. The Q signal output from the multiplier 2440 and the I signal output from the spreader 2439 are added in an adder 2453. The P-DL-DPCH signal and the S-DL-DPCH signal output from the adders 2455 and 2453, respectively are added in a summer 2451. A scrambler 2441 scrambles the output of the summer 2451 with a complex scrambling code. The scrambled signal is multiplied by a predetermined channel gain in a multiplier 2453, for channel compensation. The SHCCH is channelized and scrambled in the same procedure as seen in FIG. 22. The scrambled SHCCH signal is channel-compensated in a multiplier 2429 and fed to a summer 2431. A summer 2431 adds the DL-DPCH signal received from the multiplier 2442 and the SHCCH signal. The sum is modulated in a modulator 2433, converted to an RF signal in an RF module 2435, and then transmitted via an antenna 2437. While the transmitter illustrated in FIG. 24 scrambles the DL-DPCH and the SHCCH with different scrambling codes, the same scrambling code and different channelization codes can be used for the two channels.

FIG. 25 is a block diagram of a UE receiver for receiving a DL-DPCH from the node B transmitter shown in FIG. 24. Referring to FIG. 25, an RF signal received via an antenna 2555 is converted to a baseband signal in an RF module 2553. The baseband signal is demodulated in a demodulator 2551 and fed to two descramblers 2533 and 2549. The descrambler 2533 outputs a DL-DPCH signal by descrambling and the descrambler 2549 outputs an SHCCH signal by descrambling. The complex-valued DL-DPCH signal is separated into a real signal I and an imaginary signal Q in a complexer 2531, and the complex-valued SHCCH signal is separated into a real signal I and an imaginary signal Q in a complexer 2529. Despreaders 2525 and 2527 despread the outputs of complexers 2529 and 2531, respectively. A DEMUX 2535 extracts a pilot signal from the I and Q signals received from the despreader 2527. A channel estimator 2537 calculates a channel estimation value by estimating radio channel distortion from the pilot signal and feeds the channel estimation value to channel compensators 2521, 2523 and 2543. The channel compensator 2521 compensates for the radio channel distortion of the output of the despreader 2525 using the channel estimation value. The channel-compensated two bit streams are converted to one bit stream as a final HS-DSCH indicator 2515 in a PSC 2517. The channel compensator 2523 compensates for the radio channel distortion of the output of the despreader 2527 using the channel estimation value. The channel-compensated two bit streams are converted to one bit stream in a PSC 2519. The bit stream output from the PSC 2519 is demultiplexed to a TPC 2511, a pilot 2509, a TFCI 2507, and a downlink data signal in a DEMUX 2513. The downlink data signal is decoded to downlink data 2501 in a decoder 2503. The SCCH signal output from the descrambler 2549 is recovered to final HS-DSCH control information 2539 in the same manner as in the receiver of FIG. 23. While radio channels are estimated using the pilot signal received on the DL-DPCH in the receiver of FIG. 25, the channel estimation can be carried out using a pilot signal received on a downlink common channel.

As described above, the present invention enables flexible and efficient transmission of uplink HSDPA control information. That is, the uplink HSDPA control information is separated according to transmission characteristics. As a result, the situation is avoided where the control information is transmitted all the time when it is not necessary, and the error probability of higher priority information can be decreased. Furthermore, compatibility is provided between an HSDPA mobile communication system and a non-HSDPA mobile communication system by maintaining the UL-DPCCH structure used in the conventional asynchronous mobile communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting high speed packet data to a user equipment (UE) in a node B in a CDMA mobile communication system, comprising the steps of:

transmitting a downlink dedicated physical control channel (DL-DPCCH) signal including a pilot signal, transport format combination indicator (TFCI) bits, a downlink transmit power control (TPC) command, dedicated channel data, and a high-speed downlink shared channel (HS-DSCH) indicator indicating a shared control channel (SHCCH);

transmitting control information needed for the UE to receive the high speed packet data on the SHCCH; and spreading the high speed packet data with a spreading code included in the control information transmitted on the SHCCH and transmitting the spread high speed packet data on an HS-DSCH, wherein the high speed downlink shared channel indicator is transmitted on a secondary downlink dedicated physical channel and other signals of the DL-DPCCH signal are transmitted on a primary downlink dedicated physical channel.

2. The method of claim 1, wherein primary downlink dedicated physical channel has a different channelization code than the secondary downlink dedicated physical channel.

3. The method of claim 1, wherein a plurality of SHCCHs spread with different spreading codes are used.

4. The method of claim 2, wherein the HS-DSCH indicator includes information about the spreading codes of the SHCCHs.

5. The method of claim 1, wherein the HS-DSCH indicator is transmitted in a Transmission Time Interval (TTI) having a plurality of slots.

6. The method of claim 1, wherein the HS-DSCH indicator is transmitted in one slot of a Transmission Time Interval (TTI) having a plurality of slots.

7. A method of receiving high speed packet data from a node B in a UE in a CDMA mobile communication system, comprising the steps of:
receiving a DL-DPCCH signal including a pilot signal, TFCI bits, a TPC command, dedicated channel data, and an HS-DSCH indicator indicating an SHCCH;
receiving control information needed for receiving the high speed packet data on the SHCCH; and
despreading the high speed packet data with a spreading code included in the control information received on the SHCCH and receiving the spread high speed packet data on an HS-DSCH,
wherein the HS-DSCH indicator is transmitted on a secondary downlink dedicated physical channel and other signals of the DL-DPCCH sianal are transmitted on a primary downlink dedicated physical channel.

8. The method of claim 7, wherein primary downlink dedicated physical channel has a different channelization code than the secondary downlink dedicated physical channel.

9. The method of claim 7, wherein a plurality of SHCCHs spread with different spreading codes are used.

10. The method of claim 9, wherein the HS-DSCH indicator includes information about the spreading codes of the SHCCHs.

11. The method of claim 7, wherein the HS-DSCH indicator is received in a Transmission Time Interval (TTI) having a plurality of slots.

12. The method of claim 7, wherein the HS-DSCH indicator is received in one slot of a Transmission Time Interval (TTI) having a plurality of slots.

13. A method of transmitting feedback information for high speed packet data received from a node B in a user equipment (UE) in a CDMA mobile communication system where data is transmitted on a dedicated physical data channel (DPDCH), comprising the steps of:
spreading control information for an Uplink Dedicated Physical Data channel (UL-DPDCH) with a first spreading code and transmitting the spread UL-DPDCH control information on a primary Uplink Dedicated Physical Control channel (UL-DPCCH) (P-UL-DPCCH); and
spreading the feedback information with a second spreading code different from the first spreading code and transmitting the spread feedback information on a secondary UL-DPCCH (S-UL-DPCCH).

14. The method of claim 13, wherein the P-UL-DPCCH is transmitted on a Q channel and the UL-DPDCH and the S-UL-DPCCH are transmitted on an I channel.

15. The method of claim 13, wherein the S-UL-DPCCH includes at least an ACK/NACK (Acknowledgment/Negative Acknowledgment) signal for the received high speed packet data.

16. The method of claim 13, wherein the spreading code for the S-UL-DPCCH has a lower spreading factor than a spreading factor of the spreading code for the P-UL-DPCCH.

17. A method of receiving feedback information for transmitted high speed packet data from a user equipment (UE) in a node B that receives user data from the UE on an Uplink Dedicated Physical Data channel (UL-DPDCH) in a CDMA mobile communication system, comprising the steps of:
receiving UL-DPDCH control information spread with a first spreading code on a Primary Uplink Dedicated Physical Control channel (P-UL-DPCCH); and
receiving the feedback information spread with a second spreading code different from the first spreading code on a Secondary Uplink Dedicated Physical Control channel (S-UL-DPCCH).

18. The method of claim 17, wherein the P-UL-DPCCH is received on a Q channel and the UL-DPDCH and the S-UL-DPCCH are received on an I channel.

19. The method of claim 17, wherein the S-UL-DPCCH includes an Acknowledgement/Negative Acknowledgment (ACK/NACK) signal for the transmitted high speed packet data.

20. The method of claim 17, wherein the spreading code for the S-UL-DPCCH has a lower spreading factor than a spreading factor of the spreading code for the P-UL-DPCCH.

21. The method of claim 13, wherein the S-UL-DPCCH includes a channel quality indicator (CQI) for the received high speed packet data.

22. The method of claim 15, wherein the S-UL-DPCCH includes the ACK/NACK and a channel quality indicator (CQI) for the received high speed packet data.

23. The method of claim 17, wherein the S-UL-DPCCH includes a channel quality indicator (CQI) for the transmitted high speed packet data.

24. The method of claim 19, wherein the S-UL-DPCCH includes the ACK/NACK and a channel quality indicator (CQI) for the transmitted high speed packet data.

* * * * *